(12) United States Patent
Magosaki

(10) Patent No.: US 8,528,220 B2
(45) Date of Patent: Sep. 10, 2013

(54) SIX-DIRECTION INDICATOR

(75) Inventor: Futoshi Magosaki, Hyogo (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 351 days.

(21) Appl. No.: 13/125,281

(22) PCT Filed: Oct. 19, 2009

(86) PCT No.: PCT/JP2009/005448
§ 371 (c)(1),
(2), (4) Date: Apr. 20, 2011

(87) PCT Pub. No.: WO2010/047078
PCT Pub. Date: Apr. 29, 2010

(65) Prior Publication Data
US 2011/0197460 A1    Aug. 18, 2011

(30) Foreign Application Priority Data

Oct. 20, 2008    (JP) ................................. 2008-270244

(51) Int. Cl.
*G01C 19/38* (2006.01)
*G01C 19/00* (2013.01)

(52) U.S. Cl.
USPC .................. 33/324; 33/313; 33/320

(58) Field of Classification Search
USPC ................... 33/313, 318, 320, 321, 324, 325, 33/326, 328, 329, 330; 74/5 R, 5.22
See application file for complete search history.

(56) References Cited

U.S. PATENT DOCUMENTS 6,594,911 B2    7/2003    Brunstein et al.
6,918,186 B2    7/2005    Ash et al.

FOREIGN PATENT DOCUMENTS

| JP | 63-205512 A | 8/1988 |
|---|---|---|
| JP | 06-003149 A | 1/1994 |
| JP | 06-011350 A | 1/1994 |
| JP | 09-138128 A | 5/1997 |
| JP | 11-160072 A | 6/1999 |
| JP | 11-190633 A | 7/1999 |
| JP | 2000-121364 A | 4/2000 |
| JP | 2001-215121 A | 8/2001 |
| JP | 2002-296037 A | 10/2002 |
| JP | 2008-215956 A | 9/2008 |
| JP | 2011213138 A * | 10/2011 |
| JP | 2012112679 A * | 6/2012 |

* cited by examiner

*Primary Examiner* — R. A. Smith
(74) *Attorney, Agent, or Firm* — Rabin & Berdo, P.C.

(57) ABSTRACT

A six-direction indicator is provided in an XYZ rectangular coordinate system and includes a shaft on an X axis, a rotation member rotatable around an axis inclined with respect to a rotation axis, guide pins provided upright on the rotation member, and a guide member provided around the X-axis to surround the rotation member. The guide member has a zig-zag slit track bent alternately in a mountain-like shape and a valley-like shape in the X direction at intervals of 60° around the X-axis. The guide pins are inserted in the slit track and move around on the slit track by rotation of the shaft. The device indicates one of the positive and negative directions on the U, V, and W axes crossing one another at intervals of 60° around the X-axis.

9 Claims, 28 Drawing Sheets

F I G. 27
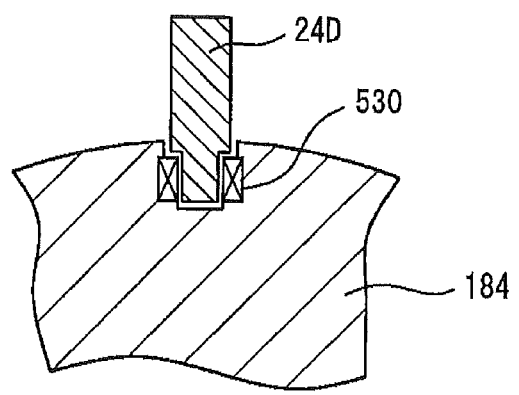

ized azimuth measuring device that does not need a horizontal plane in the disclosure of JP 2008-215956 A. The azimuth measuring device disclosed by the document takes into account a UVW rectangular coordinate system in addition to an XYZ rectangular coordinate system. Six directions, +U, −U, +V, −V, +W, and −W are provided apart at intervals of 60° when they are projected orthogonally on an YZ plane. Elevation angles formed between the U, V, and W axes and the YZ plane are each 35.26°. The azimuth measuring device includes a rotational angular velocity sensor that detects rotational angular velocities $\omega_U$, $\omega_V$, and $\omega_W$ around the respective axes in the UVW rectangular coordinate system, a gravitational acceleration sensor that detects gravitational accelerations $g_U$, $g_V$, and $g_W$ in the respective axial directions, a first stepping motor that rotates the rotational angular velocity sensor and the gravitational acceleration sensor 60×n° (n: a natural number) around the X-axis for positioning, and a second stepping motor that swings the rotational angular velocity sensor and the gravitational acceleration sensor ±35.26° around an axis orthogonal to the X-axis for positioning. The azimuth measuring device measures the rotational angular velocities $\omega_U$, $\omega_V$, and $\omega_W$ and the gravitational accelerations $g_U$, $g_V$ and $g_W$ around the respective axes and coordinate-transforms the obtained rotational angular velocities $\omega_U$, $\omega_V$, and $\omega_W$ and the gravitational accelerations $g_U$, $g_V$, and $g_W$ to produce $\omega_X$, $\omega_Y$, and $\omega_Z$ and the gravitational accelerations $g_X$, $g_Y$, and $g_Z$ in the XYZ rectangular coordinate system. Then, an azimuth angle $\Psi$ is calculated based on the obtained rotational angular velocities $\omega_X$, $\omega_Y$, and $\omega_Z$ and the gravitational accelerations $g_X$, $g_Y$, and $g_Z$. Using the azimuth measuring device, the rotational angular velocity sensor and the gravitational acceleration sensor are swung only ±35.26°, so that the rotation angle is small and a necessary space is not larger than the space required by the conventional azimuth measuring device. Therefore, the size can be reduced as compared to the conventional single-axis azimuth measuring device.

DISCLOSURE OF THE INVENTION

However, the azimuth measuring device disclosed by JP 2008-215956 A includes two stepping motors as rotational driving sources. If the device can indicate the six directions only using a single rotational driving source, the device can be even more reduced in size.

It is an object of the present invention to provide a six-direction indicator that can indicate six directions using a single rotational driving source.

A six-direction indicator according to the present invention is provided in an XYZ rectangular coordinate system. The six-direction indicator includes an inclined crank mechanism, a driving source, and a guide member. The inclined crank mechanism includes a shaft that extends in an X-axis direction and a rotation member. The rotation member is rotatable around an inclined axis inclined with respect to said shaft and coupled to said shaft. The driving source rotates said shaft around the X-axis. The guide member has a zigzag circumferential edge provided around the X-axis of said inclined crank mechanism and bent alternately in a mountain-like shape and a valley-like shape at intervals of 60° around the X-axis. The rotation member includes a guide pin. The guide pin is provided upright around the inclined axis of said rotation member and in contact with said circumferential edge, moves around on said circumferential edge by rotation of said shaft and indicates one of positive and negative directions on U, V, and W axes crossing one another at intervals of 60° around the X axis.

In the six-direction indicator according to the present invention, the guide pin provided upright at the rotation member is in contact with the circumferential edges of the guide member. When the shaft is rotated, the rotation member rotates around the X axis and around the inclined axis as well. Therefore, the guide pin can move around the X-axis and indicate the ±directions on the U, V, and W directions (six directions in total) crossing one another while swinging in the X-direction depending on an angle formed between the X axis and the inclined axis.

BRIEF DESCRIPTION OF THE DRAWINGS

FIG. 1 is viewed from the front of the device.

FIG. 27 is a sectional view of the rotation member in the vicinity of a guide pin in FIG. 25.

BEST MODE FOR CARRYING OUT THE INVENTION

Figure 1:
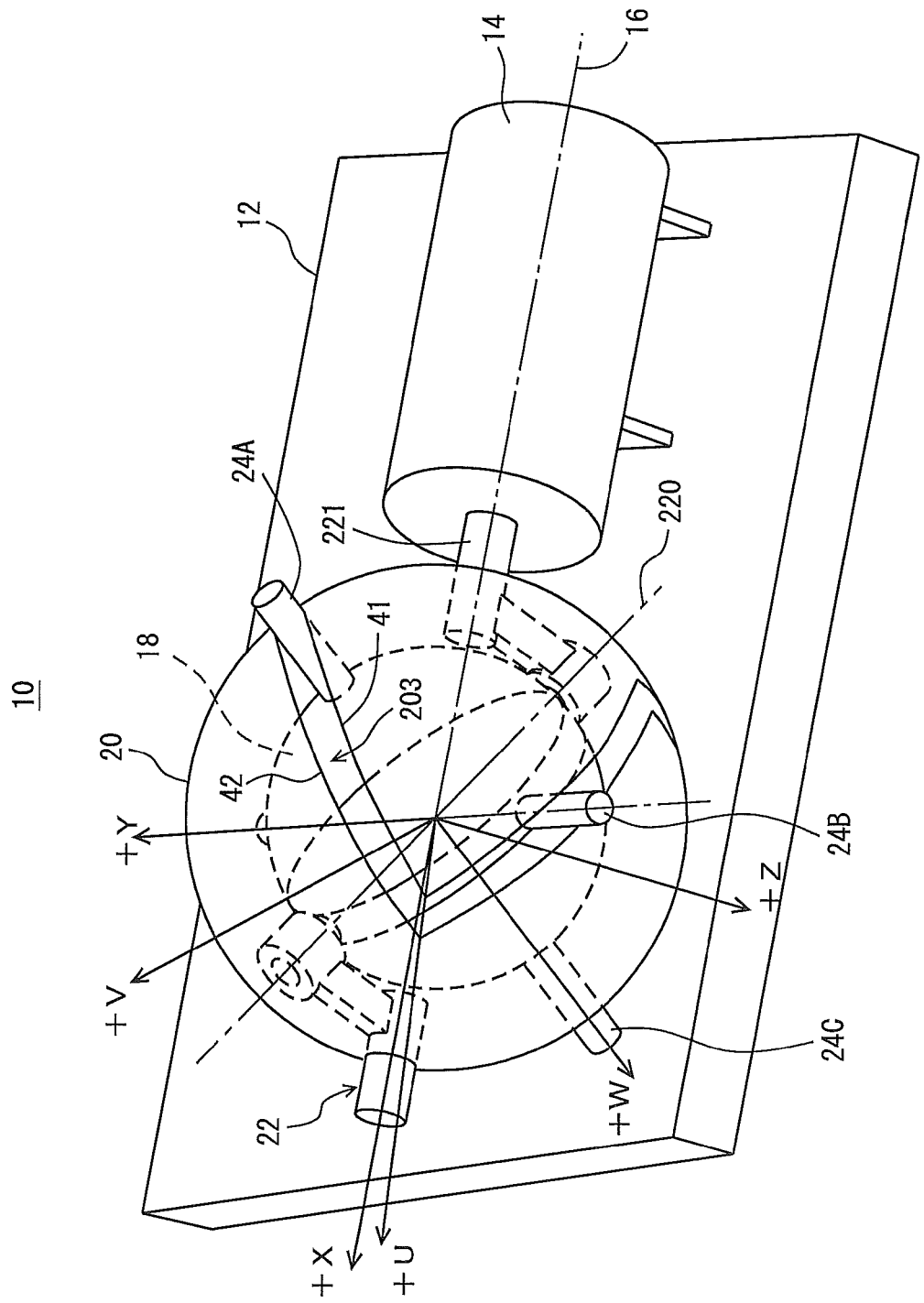
FIG. 1 is a perspective view showing an outside structure of a six-direction indicator according to a first embodiment of the present invention.

Now, an embodiment of the present invention will be described in detail in conjunction with the accompanying drawings in which the same or corresponding portions are designated by the same reference characters and their description will not be repeated.

Structure of Six-Direction Indicator

Referring to FIG. 1, the six-direction indicator 10 includes a stepping motor 14 as a driving source, an inclined crank mechanism 22, and a guide member 20. The inclined crank mechanism 22 includes shafts 221 coupled to a motor shaft 16 of the stepping motor 14 and a rotation member 18 rotatable around an inclined axis 220 inclined with respect to the shaft 221. The guide member 20 is a spherical outer shell provided circumferentially around the rotation member 18. In the six-direction indicator 10, the stepping motor 14 and the guide member 20 are fixed to a base 12. In this example, the stepping motor is used as a driving source, while an ultrasonic motor may be used instead of the stepping motor and the kind of motor is not specifically limited.

The six-direction indicator 10 is provided in an XYZ rectangular coordinate system. The coordinate system is a rectangular coordinate system in which the X, Y, and Z axes are at right angles to one another. More specifically, the X-axis is allocated on the motor shaft 16 of the stepping motor 14 and an XY plane is allocated parallel to the surface of the base 12.

Figure 2:
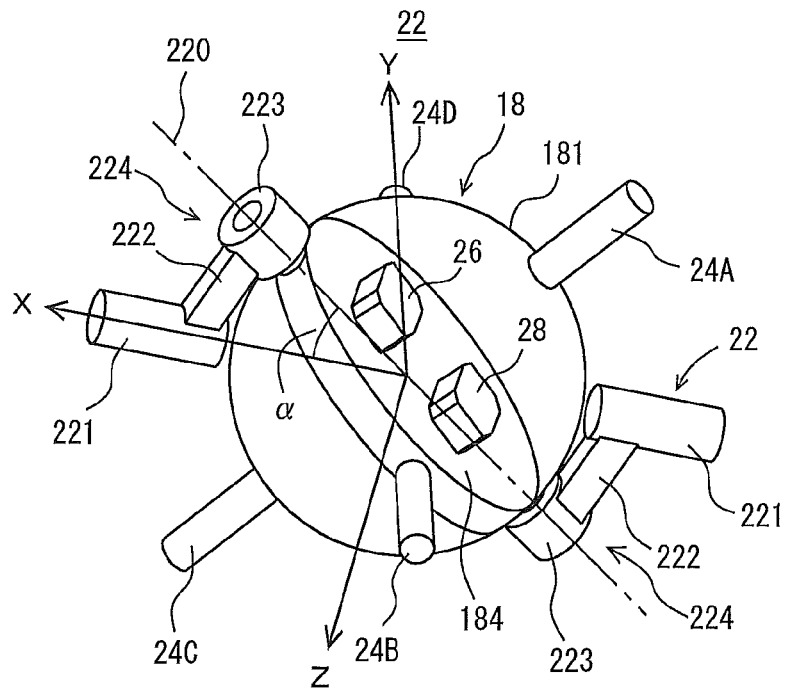
FIG. 2 is a perspective view showing an outside structure of a crank mechanism shown in FIG. 1.

Referring to FIG. 2, two shafts 221 of the inclined crank shaft 22 are both provided on the X-axis. The rotation member 18 is provided between the two shafts 221. An arm member 224 is provided between each of the shafts 221 and the rotation member 18. The rotation member 18 is coupled to each of the shafts 221 with a corresponding arm member 224. As shown in FIG. 1, the two shafts 221 are supported rotatably at the guide member 20.

Figure 3:
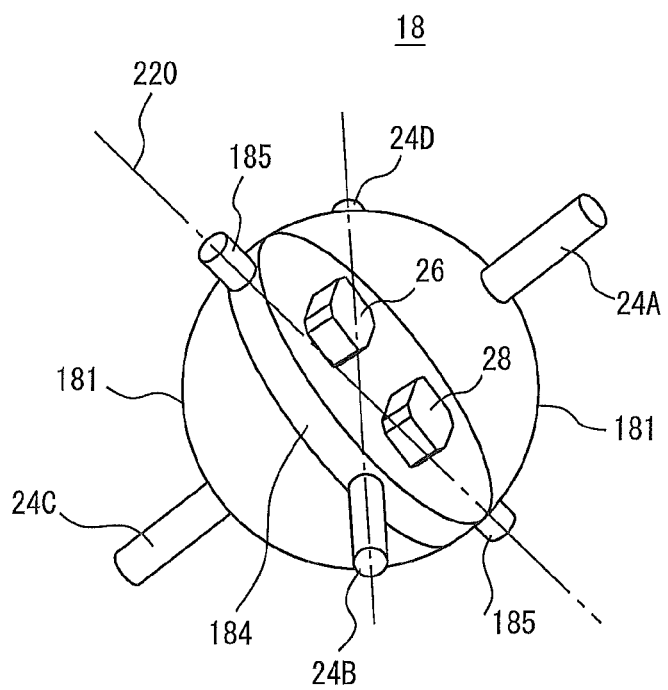
FIG. 3 is a perspective view showing an outside structure of a rotation member in FIG. 2.

Referring to FIGS. 2 and 3, the rotation member 18 includes a disk shaped substrate 184 and an inner shell 181. The inner shell 181 is spherical and covers upper and lower surfaces of the substrate 184. As shown in FIG. 3, two axial members 185 are provided on a side surface of the substrate 184. The two axial members 185 are provided on the same straight line that passes through a center of the substrate 184.

The arm member 224 includes a crank arm 222 and a boss 223. The boss 223 is formed at an end of the crank arm 222. The axial member 185 is fitted into the boss 223. In this way, the substrate 184 is attached rotatably around the inclined axis 220 that is inclined $\alpha°$ with respect to the shaft 221.

Two guide pins 24B and 24D are provided upright in positions on the side surface of the substrate 184 that are orthogonal to the axial members 185. The guide pins 24B and 24D are rod-shaped members that extend in the lengthwise direction. The guide pins 24B and 24D are orthogonal to the inclined axis 220. Two guide pins 24A and 24C are provided upright on the surface of the inner shell 181 on a normal to the substrate 184 that passes through the center of the substrate 184. The guide pins 24A and 24C are rod-shaped members that extend in the lengthwise direction.

The guide pins 24A to 24D are each orthogonal to the inclined axis 220. The guide pins 24A and 24C are provided on the same straight line and the guide pins 24B and 24D are provided on the same straight line. The guide pins 24A to 24D are all provided on the same plane.

A rotational angular velocity sensor 26 and a gravitational acceleration sensor 28 are attached on the substrate 184. The indication directions of the sensors 26 and 28 match the normal direction to the substrate 184. In other words, the directions match the axial direction of the guide pin 24A. The rotational angular velocity sensor 26 detects a rotational angular velocity component around the indication direction (i.e., the axial direction of the guide pin 24A). The gravitational acceleration sensor 28 detects a gravitational acceleration component in the indication direction.

Figure 4A:
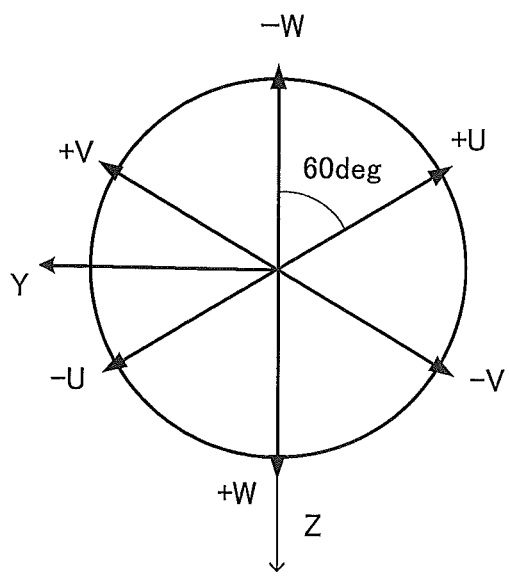
FIG. 4A shows a YZ plane showing a positional relation between the XYZ coordinate system in which the six-direction indicator shown in FIG. 1 is provided and the UVW coordinate system used to measure a rotational angular velocity and a gravitational acceleration when viewed in the −X direction.
Figure 4B:
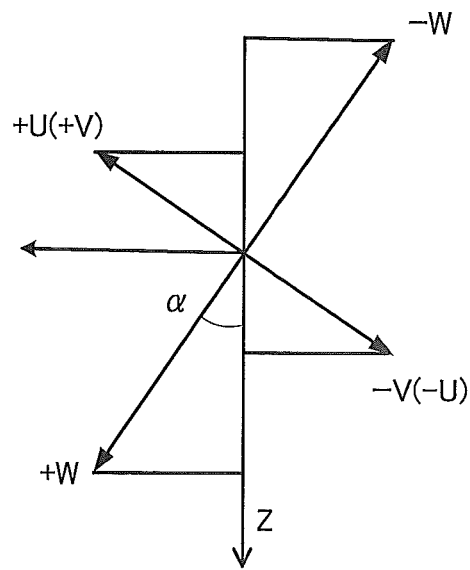
FIG. 4B shows a ZX plane showing a positional relation between the XYZ coordinate system in which the six-direction indicator shown in FIG. 1 is provided and the UVW coordinate system used to measure a rotational angular velocity and a gravitational acceleration when viewed in the +Y direction.

As described above, the six-direction indicator 10 is provided in the XYZ rectangular coordinate system. According to the present embodiment, a UVW coordinate system is taken into account. The relation between the XYZ rectangular coordinate system and the UVW coordinate system is given in FIGS. 4A and 4B. FIG. 4A is a view of a YZ plane as viewed in the −X direction and FIG. 4B is a view of a ZX plane as viewed in the +Y direction (a right side view of FIG. 4A). The elevation angle formed between the U, V, and W axes and the YZ plane is an angle $\alpha$. More specifically, the angle $\alpha$ of the inclined axis 220 with respect to the shaft 221 matches the elevation angle. Furthermore, the crossing angle formed among the U, V, and W axes is $\beta$.

The six axes, in other words, the +U, −U, +V, −V, +W, and −W are always provided at intervals of 60° on the YZ plane. More specifically, the +U axis is inclined 60° with respect to the −Z axis when it is orthogonally projected on the YZ plane. The −U axis is inclined 60° with respect to the +Z axis when it is orthogonally projected on the YZ plane. The +V axis is inclined at 60° with respect to the −Z axis when it is orthogonally projected on the YZ plane. The −V axis is inclined at 60° with respect to the +Z axis when it is orthogonally projected on the YZ plane. The +W axis matches the +Z axis when it is orthogonally projected on the YZ plane. The −W axis matches the −Z axis when it is orthogonally projected on the YZ plane. In this case, the elevation angle $\alpha$ is preferably from 30° to 40°, most preferably 35.26°. The crossing angle $\beta$ is most preferably 90°. The reason for the preference will be described and in the following description, $\alpha$ is 35.26° and $\beta$ is 90°.

Figure 5:
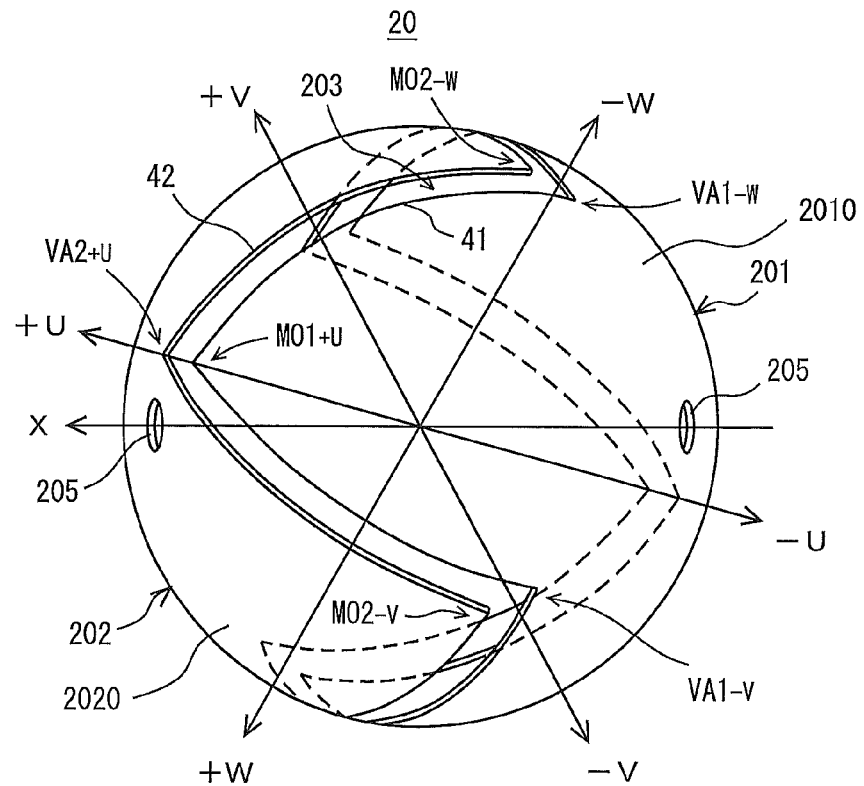
FIG. 5 is a side view of a guide in FIG. 1.
Figure 6:
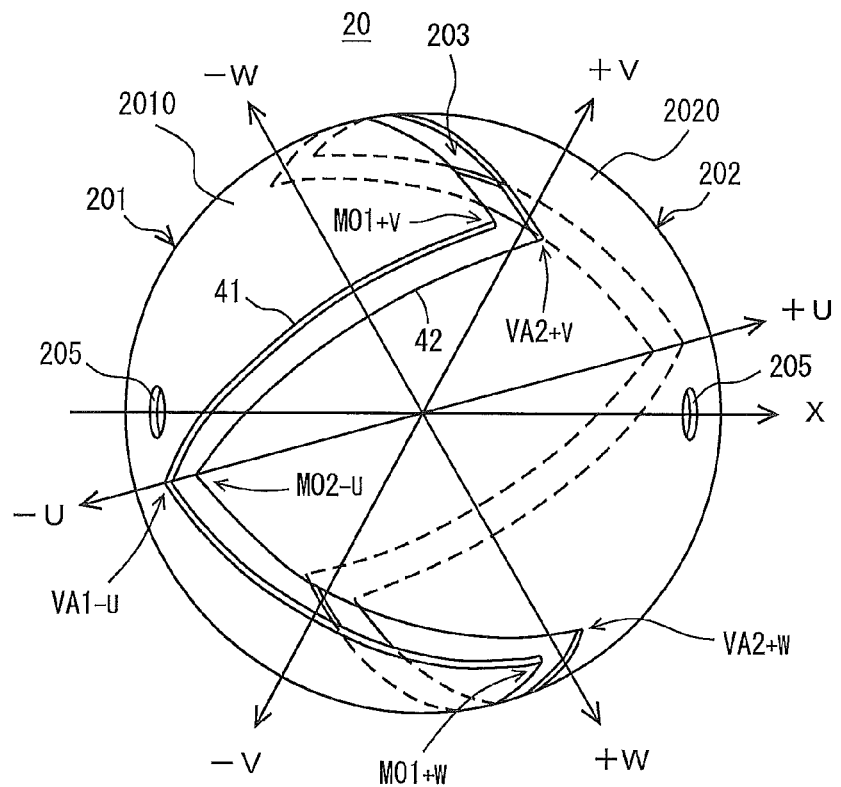
FIG. 6 is a side view of the guide on a side opposite to that shown in FIG. 5.

FIG. 5 is a side view of the guide member 20 and FIG. 6 is a side view of the guide member on the opposite side to FIG. 5. A portion of the guide member 20 on the X-axis has holes 205 through which the two shafts 221 of the inclined crank mechanism 22 are passed. The two shafts 221 are each inserted in a corresponding one of the holes. Therefore, the rotation member 18 is supported by the guide member 20. The holes 205 are provided with bearings that are not shown.

The guide member 20 further has a track slit 203 formed around the X axis along the entire circumference in the center. The track slit 203 is a zigzag slit bent alternately in mountain-like and valley-like shapes in the X direction at intervals of 60° around the X axis.

The guide member 20 has a first guide member 201 and a second guide member 202. The first guide member 201 is provided on the side of the stepping motor 14 with respect to the track slit 203 as a boundary. The second guide member 202 is provided on the opposite side to the stepping motor 14 with respect to the track slit 203 as a boundary. The first guide member 201 includes a circumferential wall 2010 and a circumferential edge 41. The circumferential wall 2010 is provided around the X-axis and has an opening in the X direction. The circumferential edge 41 is an end of the circumferential wall 2010 and has mountain-like portions MO1 and valley-like portions VA1 alternately formed at intervals of 60° around the X axis.

Similarly to the first guide member 201, the second guide member 202 includes a circumferential wall 2020 and a circumferential edge 42. The circumferential wall 2020 is provided around the X axis and has an opening in the X axis direction. The circumferential edge 42 is an end of the circumferential wall 2020 and has mountain-like portions MO2 and valley-like portions VA2 alternately formed at intervals of 60° around the X axis.

The track slit 203 is formed by the circumferential edge 41 of the first guide member and the circumferential edge 42 of the second guide portion 202. The circumferential edges 41 and 42 are opposed to and apart from each other. The mountain-like portions MO2 and the valley-like portions VA2 of the circumferential edge 42 are provided around the X-axis as they are 60° shifted from the mountain-like portions MO1 and the valley-like portions VA1 of the circumferential edge 41. Therefore, a zigzag gap is formed between the circumferential edges 41 and 42 to define the track slit 203.

The tops of the mountain-like portions MO1 and MO2 and the bottoms of the valleys VA1 and VA2 correspond to the U, V, and W axes. The bottom $VA1_{-V}$ and the top $MO1_{+V}$ of the circumferential edge 41 and the top $MO2_{-V}$ and the bottom $VA2_{+V}$ of the circumferential edge 42 both correspond to the V axis. In other words, the V-axis passes a bent point formed by the bottom $VA1_{-V}$ and the top $MO2_{-V}$ and a bent point formed by the top $MO1_{+V}$ and the bottom $VA2_{+V}$ in the track slit 203. Similarly, the top $MO1_{+U}$, the bottom $VA2_{+U}$, the top $MO2_{-U}$ and the bottom $VA1_{-U}$ correspond to the U axis. The top $MO1_{+W}$, the bottom $VA2_{+W}$, the top $MO2_{-W}$, and the bottom $VA1_{-W}$ correspond to the W axis.

Referring back to FIG. 1, the four guide pins 24A to 24D provided upright on the rotation member 18 are inserted to the track slit 203. The guide pins 24A to 24D each contact the circumferential edges 41 and/or 42. When the stepping motor 14 is driven and the shaft 221 starts to rotate, the rotation member 18 coupled to the shaft 221 also rotates. At the time, the guide pins 24A to 24D each move around on the track slit 203 while they are in contact with the circumferential edges 41 and 42. Stated differently, the guide pins 24A to 24D move around on the circumferential edges 41 and/or 42.

As the guide pins 24A to 24D move around on the track slit 203, the rotational angular velocity sensor 26 and the gravitational acceleration sensor 28 provided at the rotation member 18 can indicate the six directions (±U, ±V, and ±W directions) on the U, V, and W axes.

The guide member 20 is fixed to the base 12 in such a position that the guide pins 24A to 24D do not contact the base 12 when the guide pins 24A to 24D move around on the track slit 203.

Figure 7:
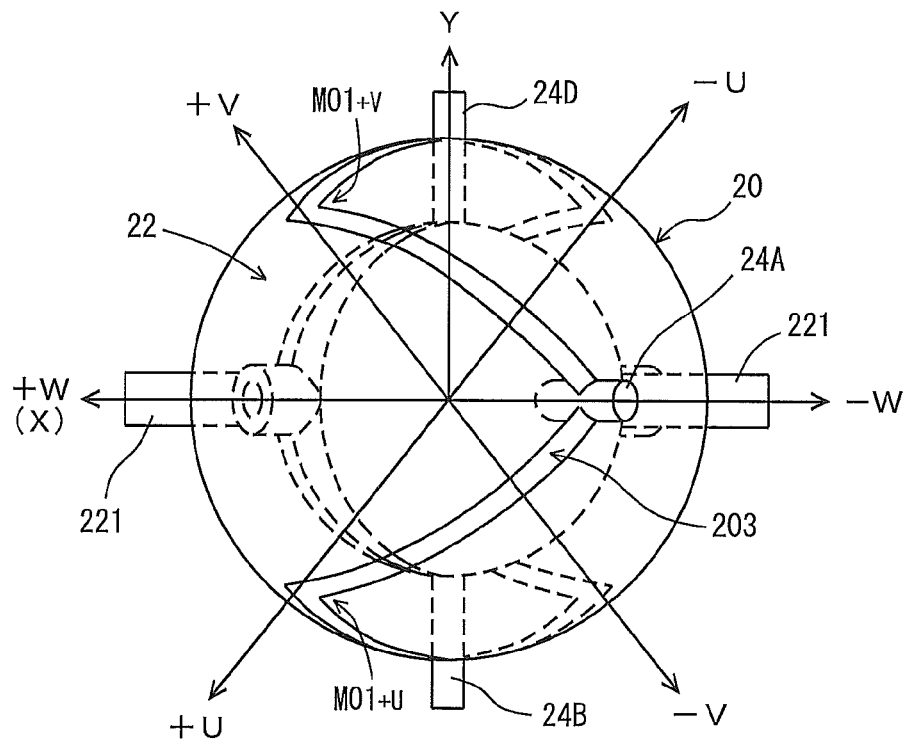
FIG. 7 is a perspective view of the guide and the rotation member in FIG. 1.
Figure 8:
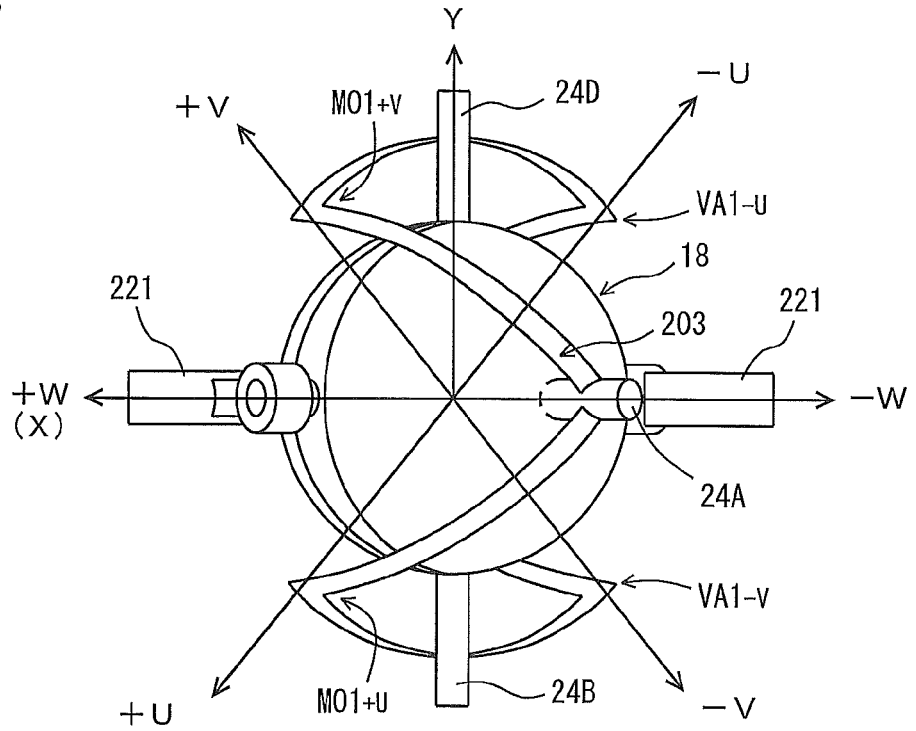
FIG. 8 is a view showing a relation between the rotation member and a slit shown in FIG. 7.

FIG. 7 is a view (top view) of the inclined crank mechanism 22 and the guide member 20 of the six-direction indicator 10 shown in FIG. 1 when viewed from immediately above (i.e., in the +Z direction) and FIG. 8 is a top view showing only the rotation member 18 and the track slit 203 in FIG. 7 for ease of illustration. In the following description, the bent points of the zigzag track slit 203 will be referred to as the tops $MO1_{+W}$, $MO1_{+V}$, and $MO1_{+W}$, and the bottoms $VA1_{-U}$, $VA1_{-V}$, and $VA1_{-W}$ of the circumferential edge 41 of the guide member 201. In the drawings to be referred to in the following, the width of the track slit 203 is smaller than the guide pins 24A to 24D, but the width of the track slit 203 is actually greater than the guide pins 24A to 24D as described above.

Referring to FIGS. 7 and 8, the four guide pins 24A to 24D are all inserted to the track slit 203. A tip end of the guide pin 24A indicates the −W direction. More specifically, in the state shown in FIGS. 7 and 8, the rotational angular velocity sensor 26 and the gravitational velocity sensor 28 indicate the −W direction.

Figure 9:
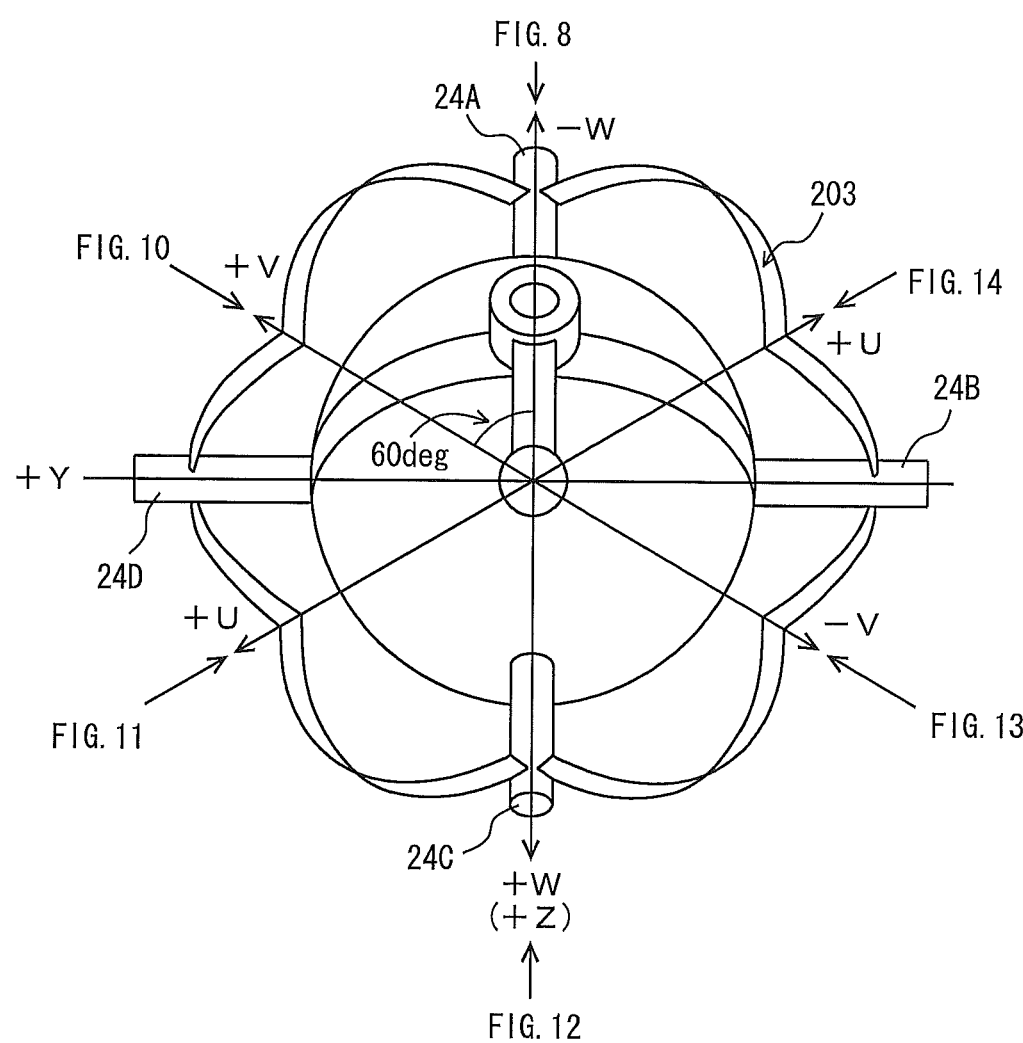
FIG. 9 is a view showing a relation between the rotation member and the slit when
Figure 10:
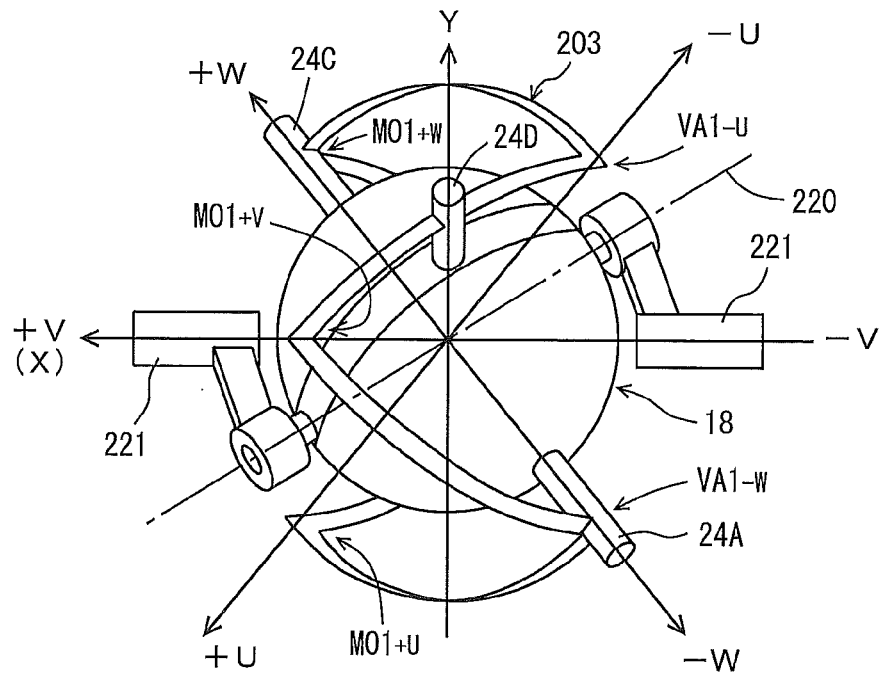
FIG. 10 is a side view of the rotation member when viewed from the obliquely upper left in FIG. 9.
Figure 11:
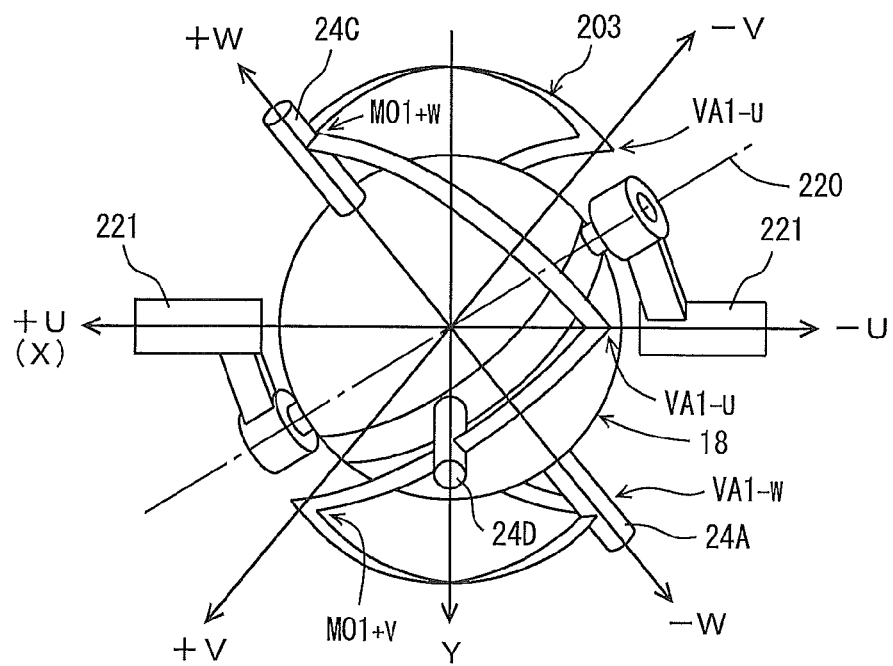
FIG. 11 is a side view of the rotation member when viewed from the obliquely lower left in FIG. 9.
Figure 12:
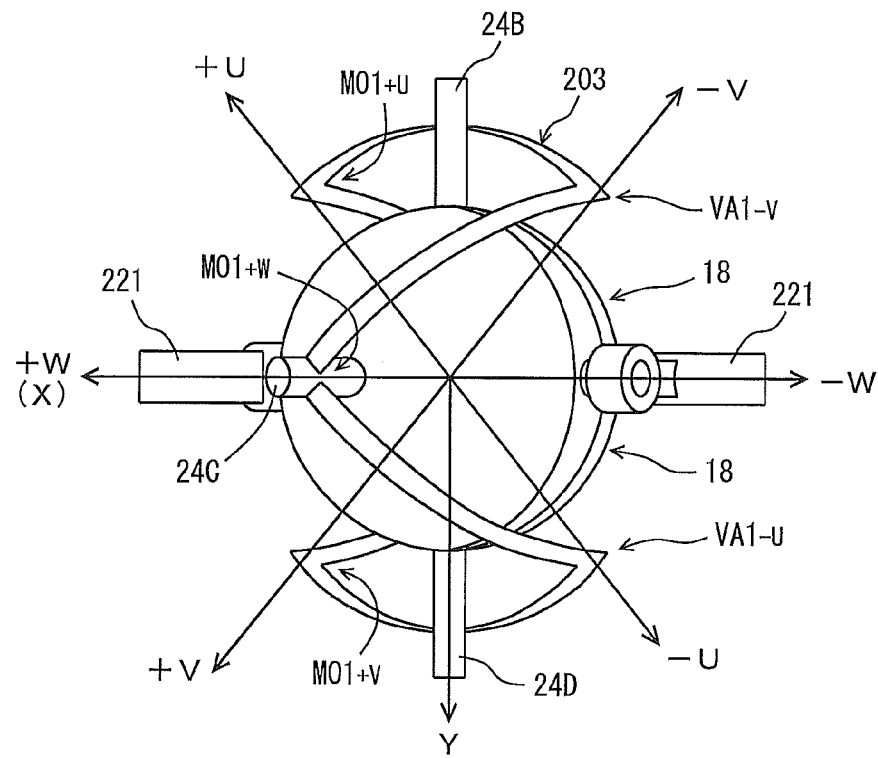
FIG. 12 is a side view of the rotation member when viewed from immediately below in FIG. 9.
Figure 13:
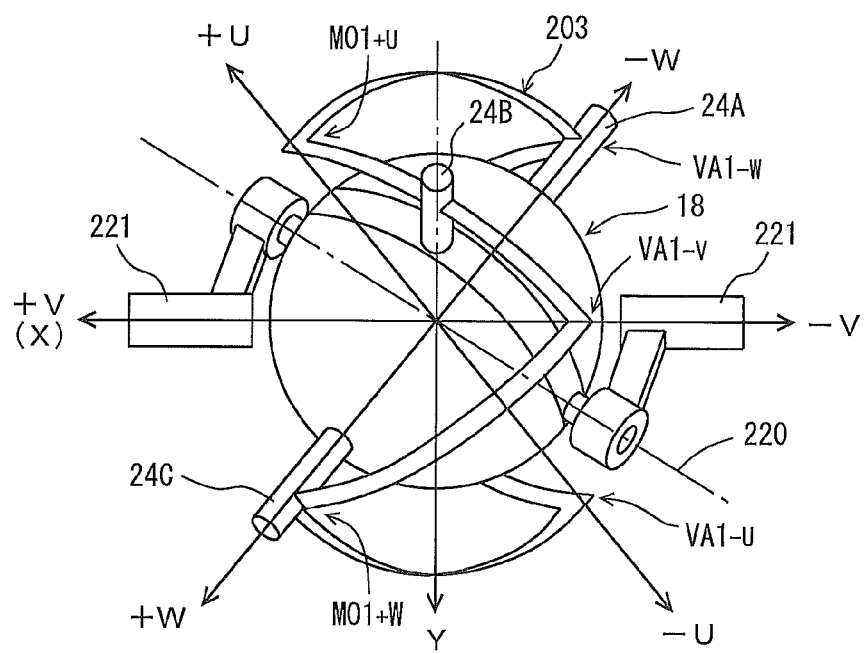
FIG. 13 is a side view of the rotation member when viewed from the obliquely upper right in FIG. 9.
Figure 14:
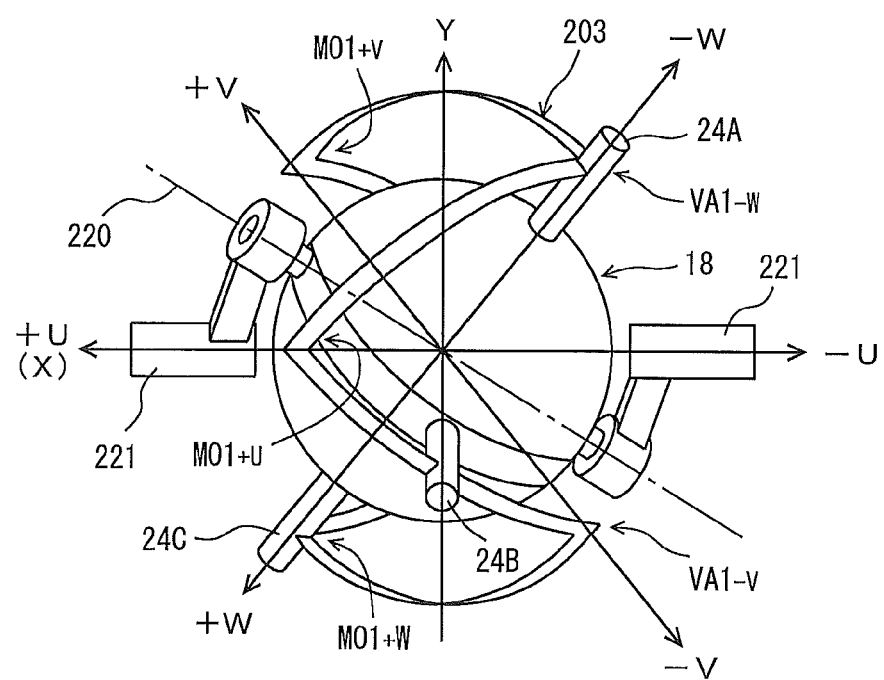
FIG. 14 is a side view of the rotation member when viewed from the obliquely upper right in FIG. 9.

FIG. 9 is a view of the rotation member 18 and the track slit 203 when the six-direction indicator 10 is viewed from the front (i.e., in the −X direction). FIGS. 10 to 14 are views of the rotation member 18 and the track slit 203 when viewed in a direction inclined at 60×n° (n: 1 to 6) around the X-axis as shown in FIG. 9.

Figure 15:
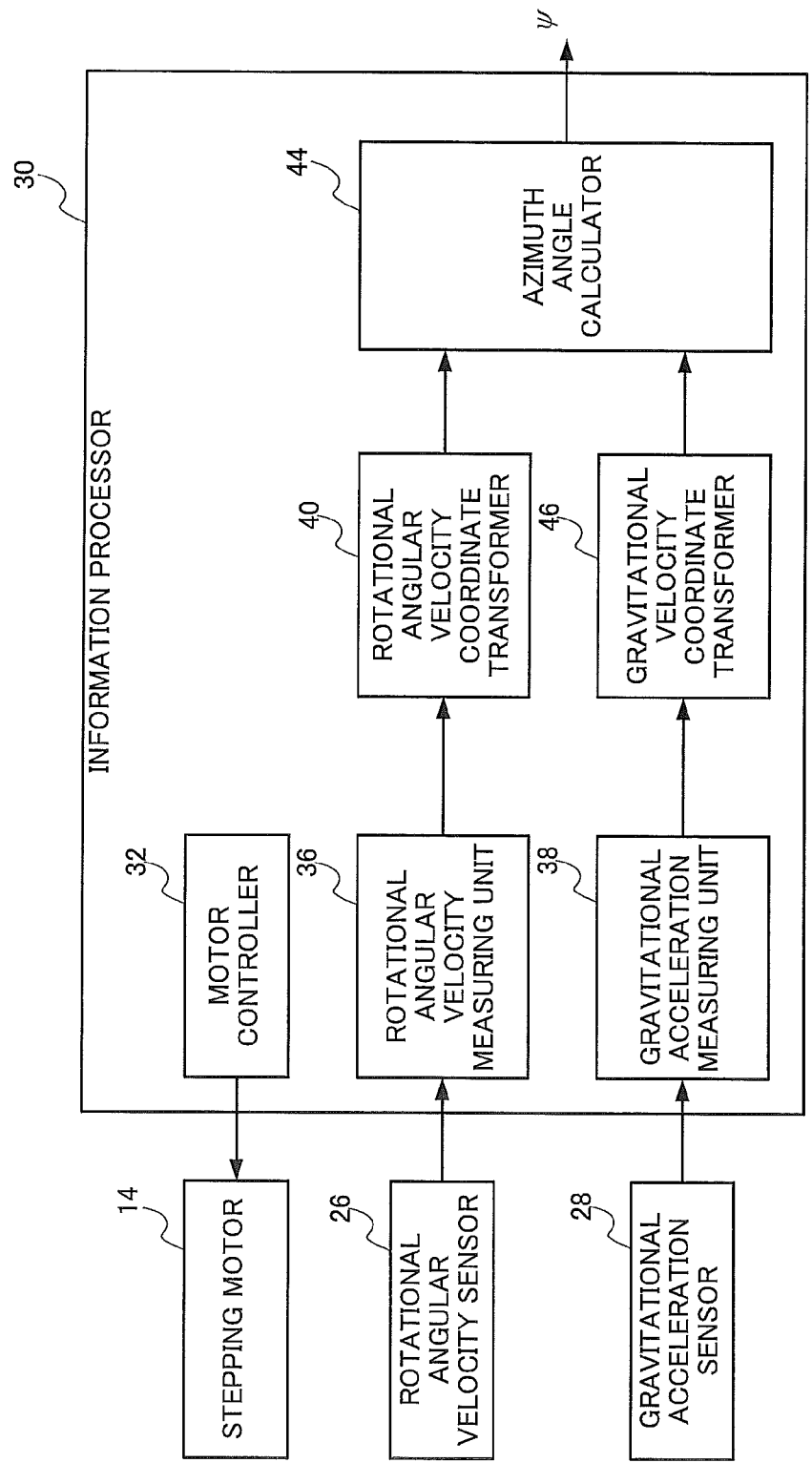
FIG. 15 is a functional block diagram for illustrating a structure of the six-direction indicator shown in FIG. 1.

Referring to FIG. 15, the six-direction indicator 10 further includes an information processor 30 including a computer and the like. The information processor 30 includes a motor controller 32, a rotational angular velocity measuring unit 36, a gravitational acceleration measuring unit 38, a rotational angular velocity coordinate transformer 40, a gravitational acceleration coordinate transformer 46, and an azimuth angle calculator 44.

The motor controller 32 controls the stepping motor 14. The rotational angular velocity measuring unit 36 measures rotational angular velocity components $\omega_U$, $\omega_V$, and $\omega_W$ detected by the rotational angular velocity sensor 26. The gravitational acceleration measuring unit 38 measures gravitational acceleration components $g_U$, $g_V$, and $g_W$ detected by the gravitational acceleration sensor 28.

The rotational angular velocity coordinate transformer 40 coordinate-transforms the angular velocity components $\omega_U$, $\omega_V$, and $\omega_W$ measured by the rotational angular velocity measuring unit 36 into rotational angular velocity components $\omega_X$, $\omega_Y$, and $\omega_Z$ by the following Expression (4):

$$\begin{bmatrix} \omega_X \\ \omega_Y \\ \omega_Z \end{bmatrix} = \begin{bmatrix} \frac{1}{3\sin\alpha} & \frac{1}{3\sin\alpha} & \frac{1}{3\sin\alpha} \\ \frac{1}{\sqrt{3}\cos\alpha} & \frac{1}{\sqrt{3}\cos\alpha} & 0 \\ -\frac{1}{3\cos\alpha} & -\frac{1}{3\cos\alpha} & \frac{2}{3\cos\alpha} \end{bmatrix} \begin{bmatrix} \omega_U \\ \omega_V \\ \omega_W \end{bmatrix} \quad (4)$$

The gravitational acceleration coordinate transformer 46 coordinate-transforms the gravitational acceleration components $g_U$, $g_V$, and $g_W$ measured by the gravitational acceleration measuring unit 38 into gravitational acceleration components $g_X$, $g_Y$, and $g_Z$ by the following Expression (5):

$$\begin{bmatrix} g_X \\ g_Y \\ g_Z \end{bmatrix} = \begin{bmatrix} \frac{1}{3\sin\alpha} & \frac{1}{3\sin\alpha} & \frac{1}{3\sin\alpha} \\ -\frac{1}{\sqrt{3}\cos\alpha} & \frac{1}{\sqrt{3}\cos\alpha} & 0 \\ -\frac{1}{3\cos\alpha} & -\frac{1}{3\cos\alpha} & \frac{2}{3\cos\alpha} \end{bmatrix} \begin{bmatrix} g_U \\ g_V \\ g_W \end{bmatrix} \quad (5)$$

The azimuth angle calculator 44 calculates an azimuth angle $\Psi$ according to the following expression (6) based on the rotational angular velocity components $\omega_X$, $\omega_Y$, and $\omega_Z$ obtained by the rotational angular velocity coordinate transformer 40 and the gravitational accelerator components $g_X$, $g_Y$, and $g_Z$ obtained by the gravitational acceleration coordinate transformer 46.

$$\psi = \tan^{-1}\left(\frac{-\omega_Y \cos\phi + \omega_Z \sin\phi}{\omega_X \cos\theta - \omega_Y \sin\phi\sin\theta + \omega_Z \cos\phi\sin\theta}\right) \quad (6)$$

$$\phi = \tan^{-1}\left(\frac{g_Y}{g_Z}\right)$$

$$\theta = -\sin^{-1}\left(\frac{g_X}{G}\right)$$

$$G = \sqrt{g_X^2 + g_Y^2 + g_Z^2}$$

Operation of Six-Direction Indicator

The operation of the six-direction indicator 10 having the above-described structure will be described.

Figure 16:
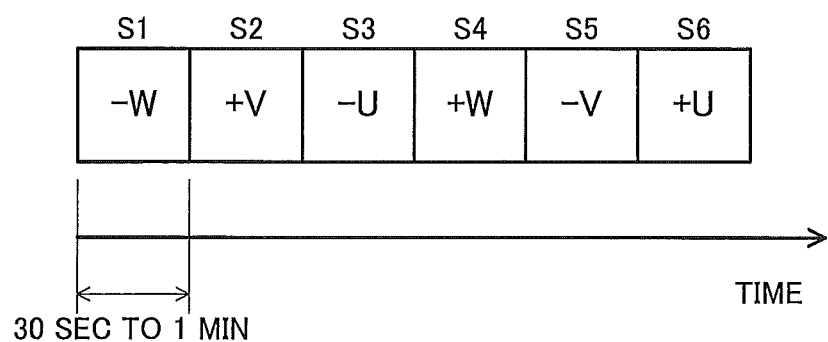
FIG. 16 shows a relation between a direction indicated by the six-direction indicator shown in FIG. 1 and operation time.

FIG. 16 shows an example of a sequence of the operation of the six-direction indicator 10. Referring to FIG. 16, the motor controller 32 controls the stepping motor 14 so that the rotational angular velocity sensor 26 and the gravitational acceleration sensor 28 are sequentially directed to the −W, +V, −U, +W, −V, and +U in this order (S1 to S6). The motor controller 32 rotates the shaft 221 240° anti-clockwise when viewed from the front of the device (i.e., in −X direction), the shaft 221, the rotation member 18, and the guide member 20 interact with one another, so that each of the sensors 26 and 28 can be directed to a corresponding direction in each of the steps. More specifically, the sensors 26 and 28 can be made to indicate the six directions (±U, ±V, and ±W directions) simply by rotating the one shaft using one driving source. Now, referring to FIGS. 16 to 22, the operation of the six-direction indicator 10 will be described in detail. In FIGS. 17 to 22, a tip end of the guide pin 24A that matches the direction indicated by each of the sensors 26 and 28 is circled for better understanding of the operation of the six-direction indicator 10.

Figure 17:
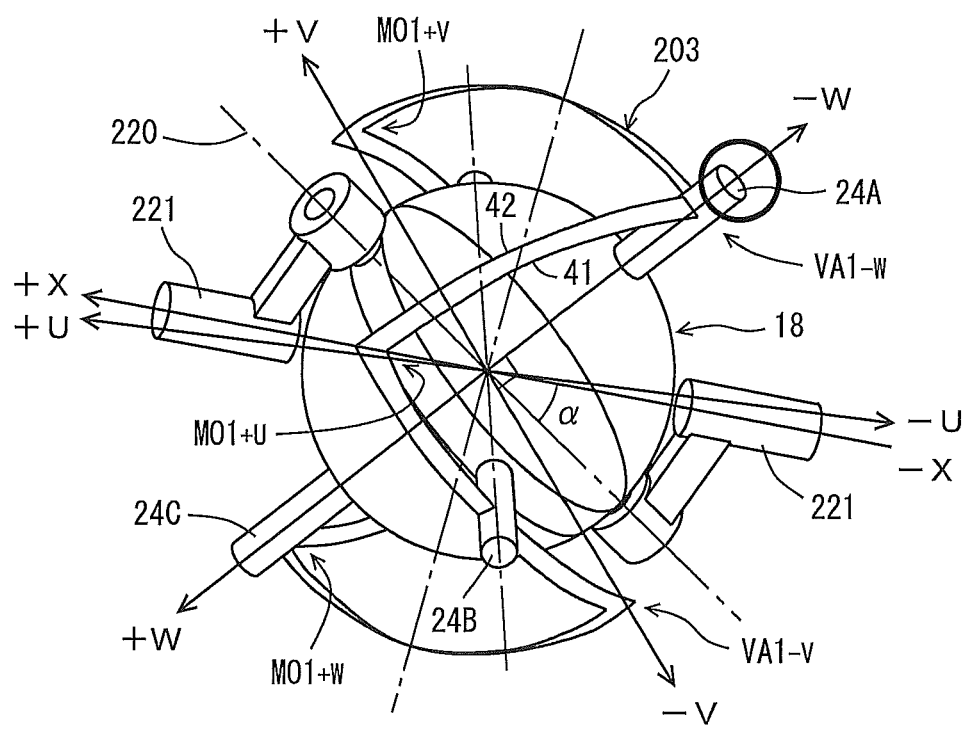
FIG. 17 is a view showing the state of the rotation member in a first step in operation shown in FIG. 16.

Referring to FIG. 17, in step S1, the guide pin 24A is positioned at the bottom $VA1_{-W}$ of the guide member 201 and its tip end indicates the −W direction. As described above, since the guide pin 24A matches the direction indicated by the rotational angular velocity sensor 26 and the gravitational acceleration sensor 28, the rotational angular velocity sensor 26 and the gravitational acceleration sensor 28 indicate the −W direction in FIG. 17. In this state, the rotational angular velocity measuring unit 36 samples a rotational angular velocity component $\omega_W$ detected by the rotational angular velocity sensor 26 in a prescribed sampling cycle (for example from 1 msec to 10 msec) and stores the values sequentially in a memory that is not shown. The gravitational acceleration measuring device 38 similarly samples a gravitational acceleration component $g_W$ detected by the gravitational acceleration sensor 28 in a prescribed sampling cycle (for example 1 msec to 10 msec) and sequentially stores the values in the memory.

Figure 18:
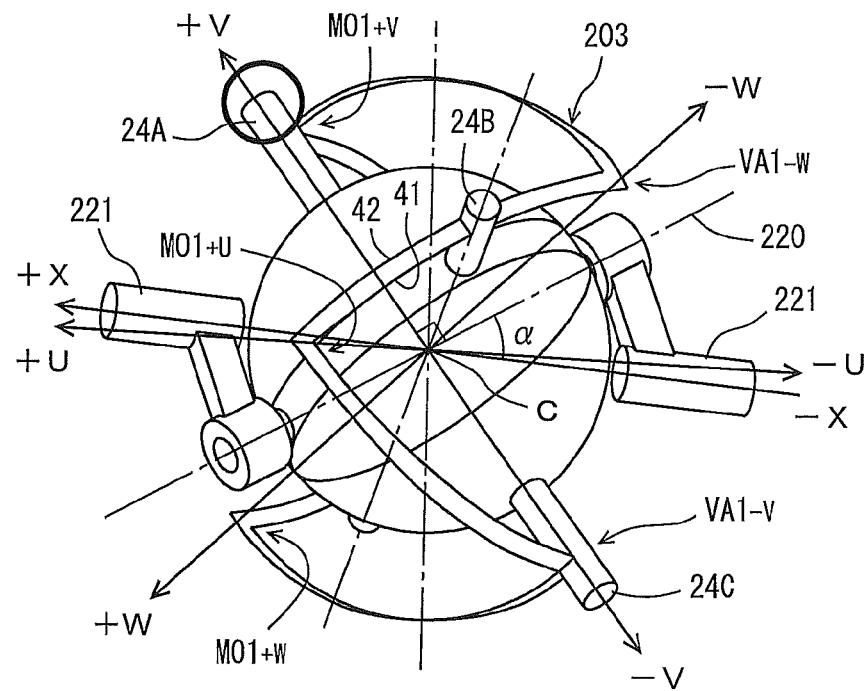
FIG. 18 is a view showing the state of the rotation member in a second step in the operation shown in FIG. 16.

Then, in step S2, the guide pins 24A to 24D are moved around on the track slit 203 in order to sample a rotational angular velocity component $\omega_V$ and a gravitational acceleration component $g_V$ in the +V direction, and the guide pin 24A is moved from the bottom $VA1_{-W}$ to $MO1_{+V}$. At the time, the motor controller 32 controls the stepping motor 14 to rotate the shaft 221 240° anti-clockwise when viewed from the front of the six-direction indicator 10. Then, as shown in FIG. 18, the guide pin 24A moves on the track slit 203 to reach the top $MO1_{+V}$ and the sensors 26 and 28 each indicate the +V direction. Now, the operation will be described in detail.

In the state shown in FIG. 17, the inclined axis 220 is orthogonal to the W axis. When the shaft 221 rotates 240° anti-clockwise from the state when viewed from the front of the device, the inclined axis 220 stops in a state where it is orthogonal to the V axis (see FIG. 18).

Here, if the guide member 20 does not exist and the rotation member 18 does not rotate around the inclined axis 220 and is fixed to the shaft 221, the rotation member 18 rotates 240° anti-clockwise around the X axis together with the shaft 221. In this case, the tip end of the guide pin 24A is directed to the −V direction.

However, the rotation member 18 can rotate around the inclined axis 220. Therefore, the guide pin 24A that is orthogonal to the inclined axis 220 rotates around the inclined axis 220. The inclined axis 220 is inclined at $\alpha°$ (35.26° in this example) with respect to the X axis (shaft 221), and therefore as the shaft 221 rotates, the guide pin 24A can swing in the range of $\pm\alpha°$ in the X direction.

In short, the guide pin 24A can rotate freely around the X axis by the rotation of the shaft 221 and can swing in the range of $\pm\alpha°$ in the X direction by rotating around the inclined axis 220. Therefore, the guide pin 24A can be made to indicate the + and − directions of the U, V, and W axes that have a relation with the XYZ rectangular coordinate system as shown in FIGS. 4A and 4B.

The track slit 203 made of the circumferential edges 41 and 42 of the guide member 20 serves to have the guide pin 24A move on the U, V, and W axes described above and to position the tip end of the pin toward the six directions (±U, ±V, and ±W directions). If for example the track slit were in a straight line shape parallel to the X axis instead of the zigzag shape as in the present embodiment, the guide pin 24A would merely swing along the X axis by the rotation of the shaft 221.

In contrast, the track slit 203 according to the present embodiment is in a zigzag arrangement that bends in mountain-like shapes (tops $MO1_{+U}$, $MO1_{+V}$, and $MO1_{+W}$) and valley-like shapes (bottoms $VA1_{-U}$, $VA1_{-V}$, and $VA1_{-W}$) alternately at intervals of 60° around the X axis. More specifically, the track is formed obliquely with respect to the X axis. Therefore, the guide pin 24A can not only swing in the X axis direction but also go around the X-axis. The top $MO1_{+U}$ and the bottom $VA_{-U}$ correspond to the U axis, the top $MO1_{+V}$ and the bottom $VA_{-V}$ correspond to the V axis, and the top $MO1_{+W}$ and the bottom $VA_{-W}$ correspond to the W axis. Therefore, as the shaft 221 rotates, the guide pin 24A swings in the range of $\pm\alpha°$ in the X direction while moving around the X axis and is provided on the U, V, and W axes when it reaches the tops and bottoms.

Referring to FIGS. 17 and 18, in step S2, when the shaft 221 rotates, the guide pin 24A contacts the circumferential edge 41 while moving on the track slit 203 from the bottom $VA1_{-W}$ toward the top $MO1_{+V}$. At the time, the guide pin 24A rotates anti-clockwise around the X axis when viewed from the front of the device (in the −X direction) as the shaft 221 rotates. The guide pin 24A contacts the circumferential edge 41 that is part of the track slit 203 and therefore receives force from the circumferential edge 41. Therefore, the rotating member 18 rotates around the inclined axis 220 clockwise when viewed from the front of the device, so that the tip end of the guide pin 24A swings from the −X direction to the +X direction. More specifically, the guide pin 24A swings in the X direction while rotating around the X axis by the slit 203.

When the shaft 221 rotates 240° anti-clockwise, the guide pin 24A rotates 60° anti-clockwise around the X axis by the track slit 203.

Furthermore, as the guide pin 24A contacts the circumferential edge 41, the rotation member 18 is provided with force to rotate clockwise around the inclined axis 220, so that the rotation member rotates 180° clockwise around the inclined axis 220. As a result, the guide pin 24A reaches the top $MO1_{+V}$ as shown in FIG. 18. At the time, the guide pin 24A is provided on the V axis and its tip end indicates the +V direction. More specifically, the sensors 26 and 28 indicate the +V direction.

When the guide pin 24A reaches the top $MO1_{+V}$, the rotational angular velocity measuring unit 36 samples a rotational angular velocity component $\omega_V$ and stores the data in the memory similarly to step S1. The gravitational acceleration measuring unit 38 also samples a gravitational acceleration component $g_V$ and stores the sampled data in the memory.

Figure 19:
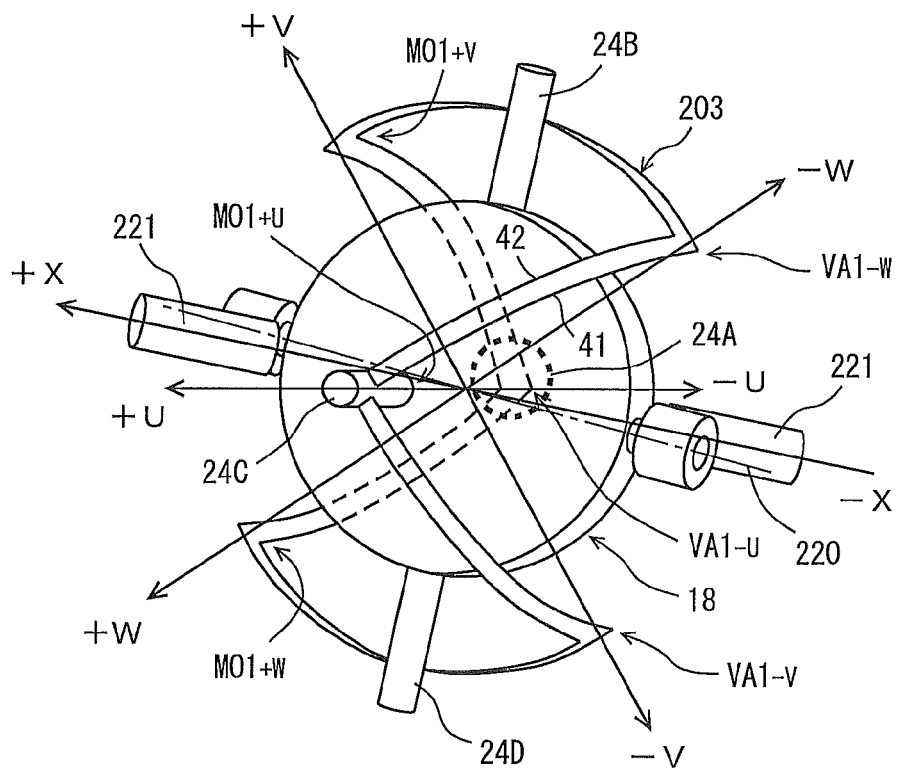
FIG. 19 is a view showing the state of the rotation member in a third step in the operation shown in FIG. 16.

Similarly to the above described step S2, the shaft 221 rotates 240° anti-clockwise each time in steps S3 to S6, so that the tip end of the guide pin 24A indicates each direction (±U, ±V, and ±W directions) on the UVW coordinates. In step S3, the shaft 221 rotates 240° anti-clockwise from the state shown in FIG. 18 when viewed from the front of the device. Then, the guide pin 24A swings $2\alpha(=70.52)°$ in the −X direction and rotates 60° anti-clockwise around the X axis when viewed from the front of the device. As a result, as shown in FIG. 19, the guide pin 24A reaches the bottom $VA1_{-U}$ of the track slit 203. At the time, the guide pin 24A is provided on the U axis and its tip end is directed to the −U direction. In this state, the rotational angular velocity measuring unit 36 samples a rotational angular velocity component $\omega_U$ and the gravitational acceleration measuring unit 38 samples a gravitational acceleration component $g_U$.

Figure 20:
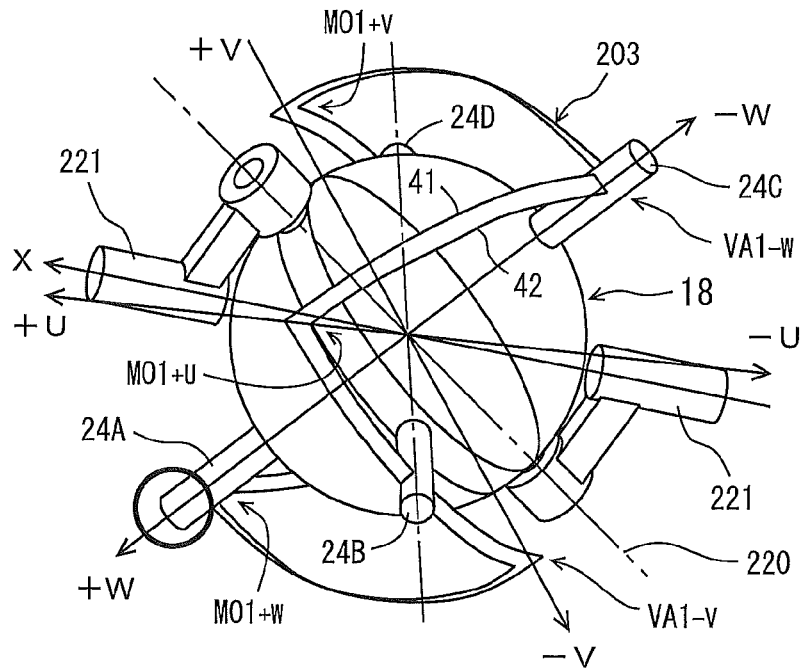
FIG. 20 is a view showing the state of the rotation member in a fourth step in the operation shown in FIG. 16.

In step S4, the shaft 221 rotates 240° anti-clockwise further from the state in FIG. 19. Then, the guide pin 24A swings $2\alpha(=70.52)°$ in the +X direction and rotates 60° anti-clockwise around the X axis when viewed from the front of the device. Therefore, as shown in FIG. 20, the guide pin 24A reaches the top $MO1_{+W}$ and is provided on the W axis, so that its tip end indicates the −W direction. In this state, the rotational angular velocity measuring unit 36 again samples a rotational angular velocity component $\omega_W$ and the gravitational acceleration measuring unit 38 also samples a gravitational acceleration component $g_W$. More specifically, the six-direction indicator 10 measures the rotational angular velocity component $\omega_W$ and the gravitational acceleration component $g_W$ both in the +W and −W directions on the W axis.

Figure 21:
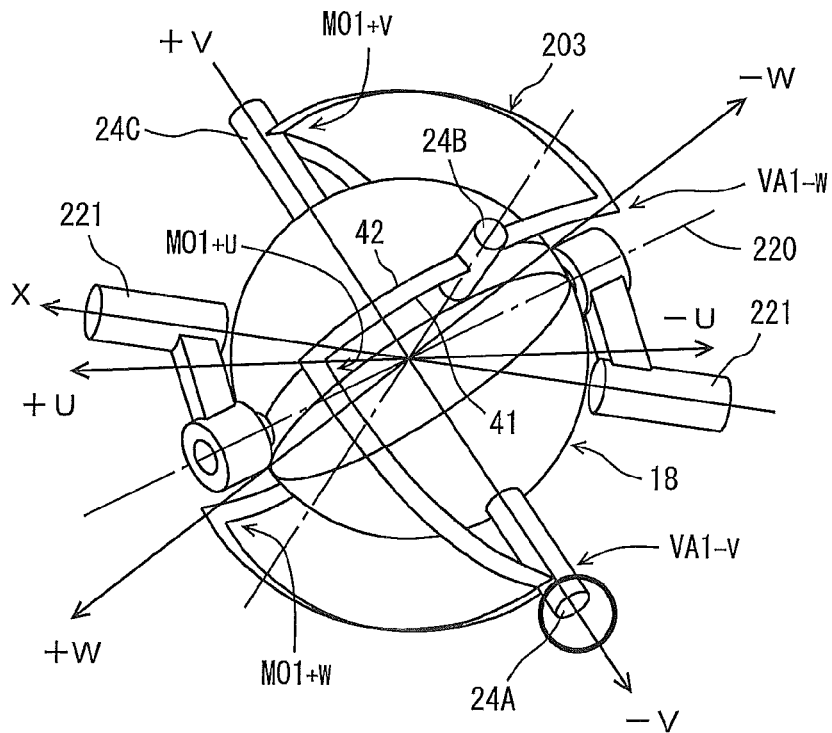
FIG. 21 is a view showing the state of the rotation member in a fifth step in the operation shown in FIG. 16.

Similarly, in step S5, the shaft 221 rotates 240° anti-clockwise when viewed from the front of the device from the state in FIG. 20. At the time, the guide pin 24A swings $2\alpha°$ in the −X direction and rotates 60° anti-clockwise around the X-axis when viewed from the front of the device. Therefore, as shown in FIG. 21, the guide pin 24A moves from the top $MO1_{+W}$ to the bottom $VA1_{-V}$ along the track slit 203. Upon reaching the bottom $VA1_{-V}$, the guide pin 24A is provided on the V axis and its tip end is directed to the −V direction. In this state, the rotational angular velocity measuring unit 36 again samples a rotational angular velocity component $\omega_V$ and the gravitational acceleration measuring unit 38 samples a gravitational acceleration component $g_V$.

Figure 22:
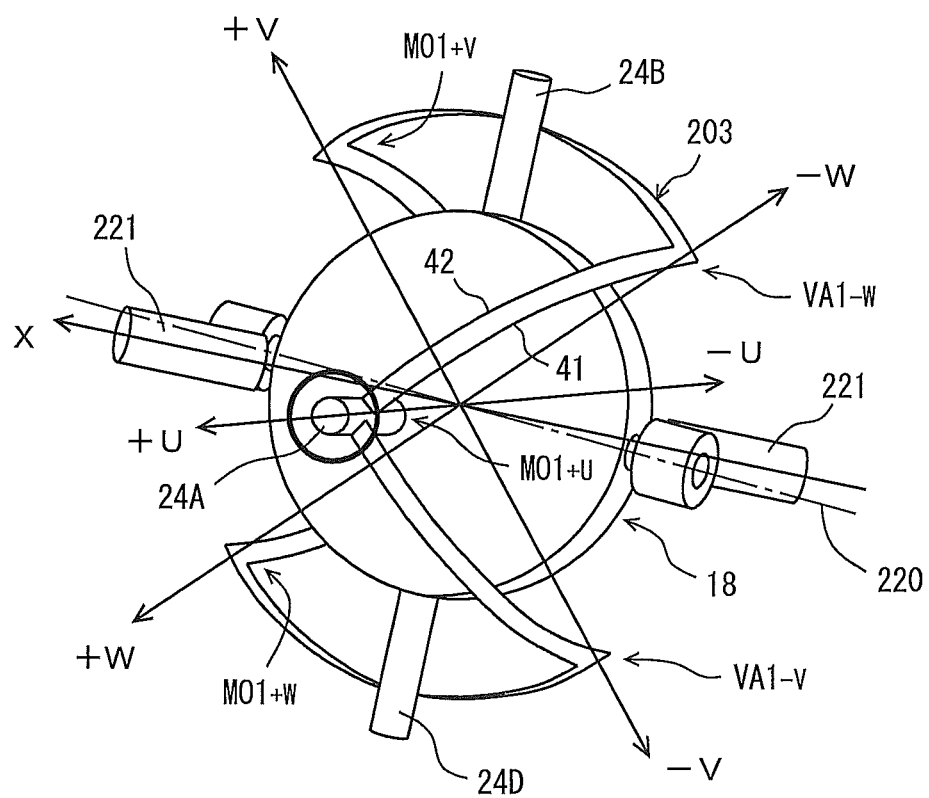
FIG. 22 is a view showing the state of the rotation member in a sixth step in the operation shown in FIG. 16.

In step S6, the shaft 221 rotates 240° anti-clockwise from the state shown in FIG. 21. At the time, the guide pin 24A rotates 60° anti-clockwise around the X axis and swings $2\alpha°$ in the +X direction. As a result, as shown in FIG. 22, the guide pin 24A reaches the top $MO1_{+U}$ from the bottom $VA1_{-V}$. At the time, the guide pin 24A is provided on the U axis and its tip end indicates the +U direction. In this state, the rotational angular velocity measuring unit 36 samples a rotational angular velocity component $\omega_U$ and the gravitational acceleration measuring unit 38 samples a gravitational acceleration component $g_U$.

Using the sampled data in steps S1 to S6, the rotational angular velocity measuring unit 36 calculates rotational angular velocities $\omega_U$, $\omega_V$, and $\omega_W$ in the UVW rectangular coordinate system by a method such as the method of least squares or arithmetic mean. The gravitational acceleration measuring unit 38 calculates $g_U$, $g_V$, and $g_W$ in the UVW rectangular coordinate system by a method such as the method of least squares or arithmetic mean. As described above, in any of the U, V, and W axes, the rotational angular velocities ($\omega_U$, $\omega_V$, and $\omega_W$) and the gravitational accelerations ($g_U$, $g_V$, and $g_W$) measured both in the + and − directions are averaged. Therefore, biases unique to the six direction indicator 10 are cancelled, so that measuring errors can be reduced.

The rotational angular velocity coordinate transformer 40 coordinate-transforms the rotational angular velocities ($\omega_U$, $\omega_V$, and $\omega_W$) calculated by the rotational angular velocity measuring unit 36 into rotational angular velocities ($\omega_X$, $\omega_Y$, and $\omega_Z$) in the XYZ rectangular coordinate system. The gravitational acceleration coordinate transformer 46 coordinate-transforms the gravitational accelerations ($g_U$, $g_V$, and $g_W$) calculated by the gravitational acceleration measuring unit 38 into gravitational accelerations ($g_X$, $g_Y$, and $g_Z$) in the XYZ rectangular coordinate system.

Finally, the azimuth angle calculator 44 calculates an azimuth angle $\Psi$ based on the rotational angular velocities ($\omega_X$, $\omega_Y$, and $\omega_Z$) and gravitational accelerations ($g_X$, $g_Y$, and $g_Z$) obtained by the rotational angular velocity coordinate transformer 40 and the gravitational acceleration coordinate transformer 46.

As in the foregoing, by the function of the rotation member 18, the guide pin 24A, and the circumferential edges 41 and 42 that forms the zigzag track slit 203, the six direction indicator 10 allows the guide pin 24A to indicate the six directions (±U, ±V, and ±W directions) only by one rotation driving source, so that the sensors 26 and 28 can indicate the six directions.

The six direction indicator 10 uses the U, V and W axes, and therefore the rotational angular velocity sensor 26 and the gravitational acceleration sensor 28 need only swing $\pm\alpha°$ (70.25°) in order to indicate the six directions, so that the rotation angle is small and a large space is not necessary to allow the rotation. Furthermore, the device can operate using only one rotation driving source as described above and therefore the device can be even more reduced in size.

According to the above-described embodiment, the elevation angle $\alpha$ is 35.26° but the elevation angle is not limited to the angle and needs only be in the range from 30° to 40°. The angle $\beta$ needs only be in the range from 80° to 100°

Figure 23:
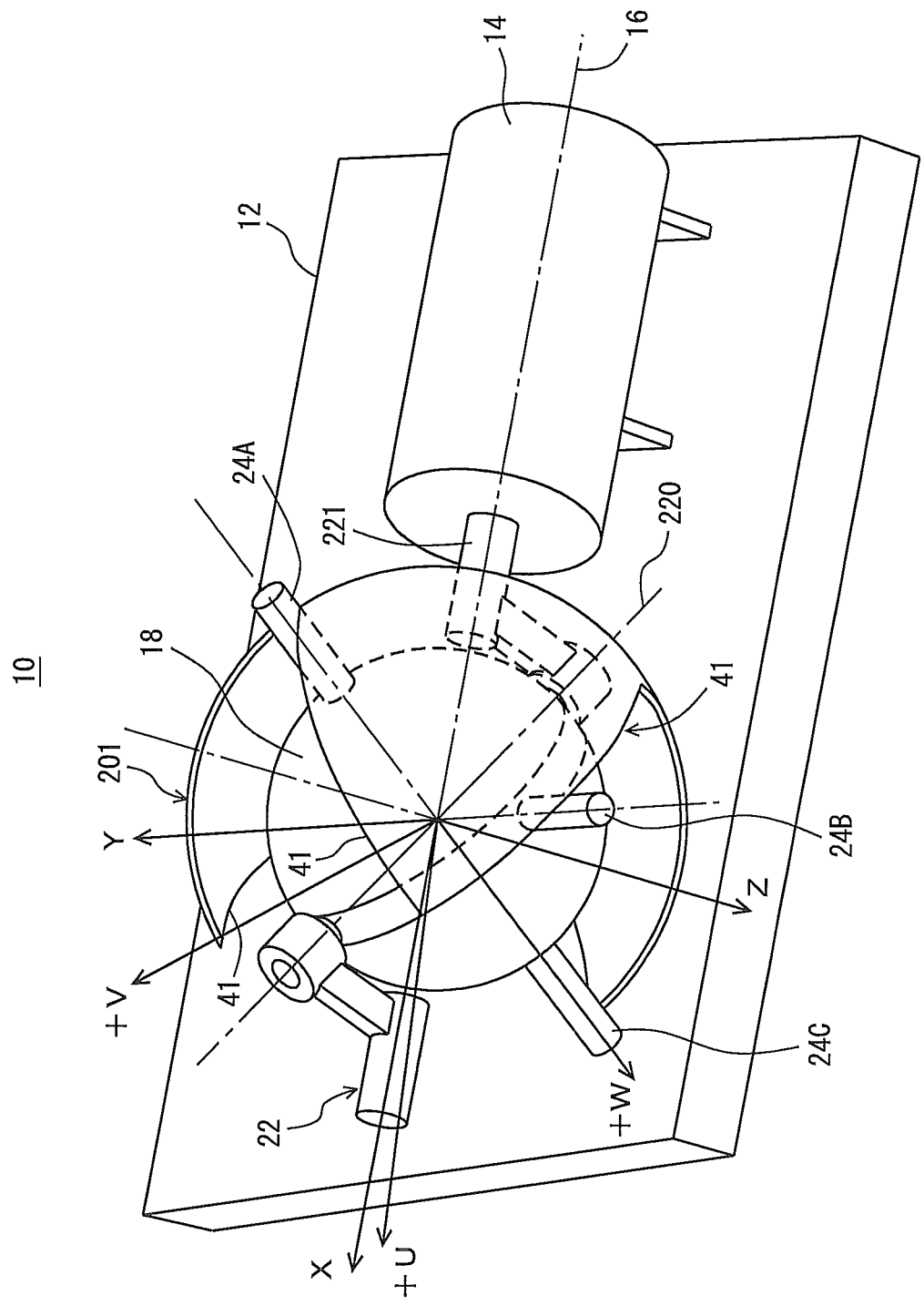
FIG. 23 is a perspective view showing an outside structure of another example of the six-direction indicator shown in FIG. 1.

The six-direction indicator 10 does not have to include both the first and second guide members 201 and 202. For example, as shown in FIG. 23, the six-direction indicator 10 may include only the first guide member 201 without having the second guide member 202 or the other way around. In this case, the circumferential edge 41 of the first guide member 201 forms a zigzag track. More specifically, the guide pins 24A to 24D are in contact with the circumferential edge 41 and rotate around the X axis.

In the arrangement shown in FIG. 23, as far as the rotation member 18 includes the guide pins 24A and 24C both provided on the same straight line, the guide pin 24A and the sensors 26 and 28 can indicate the six directions (±U, ±V, and ±W directions) only by the rotation of the shaft 221. Note that as shown in FIG. 1, when the guide member 20 includes the first and second guide members 201 and 202, at least one guide pin is necessary. In other words, even when only the guide pin 24A is provided upright at the rotation member 18 while the guide pins 24B to 24D are not provided, the guide pin 24A can move on the track slit 203 as it is in contact with the circumferential edges 41 and 42.

Figure 24:
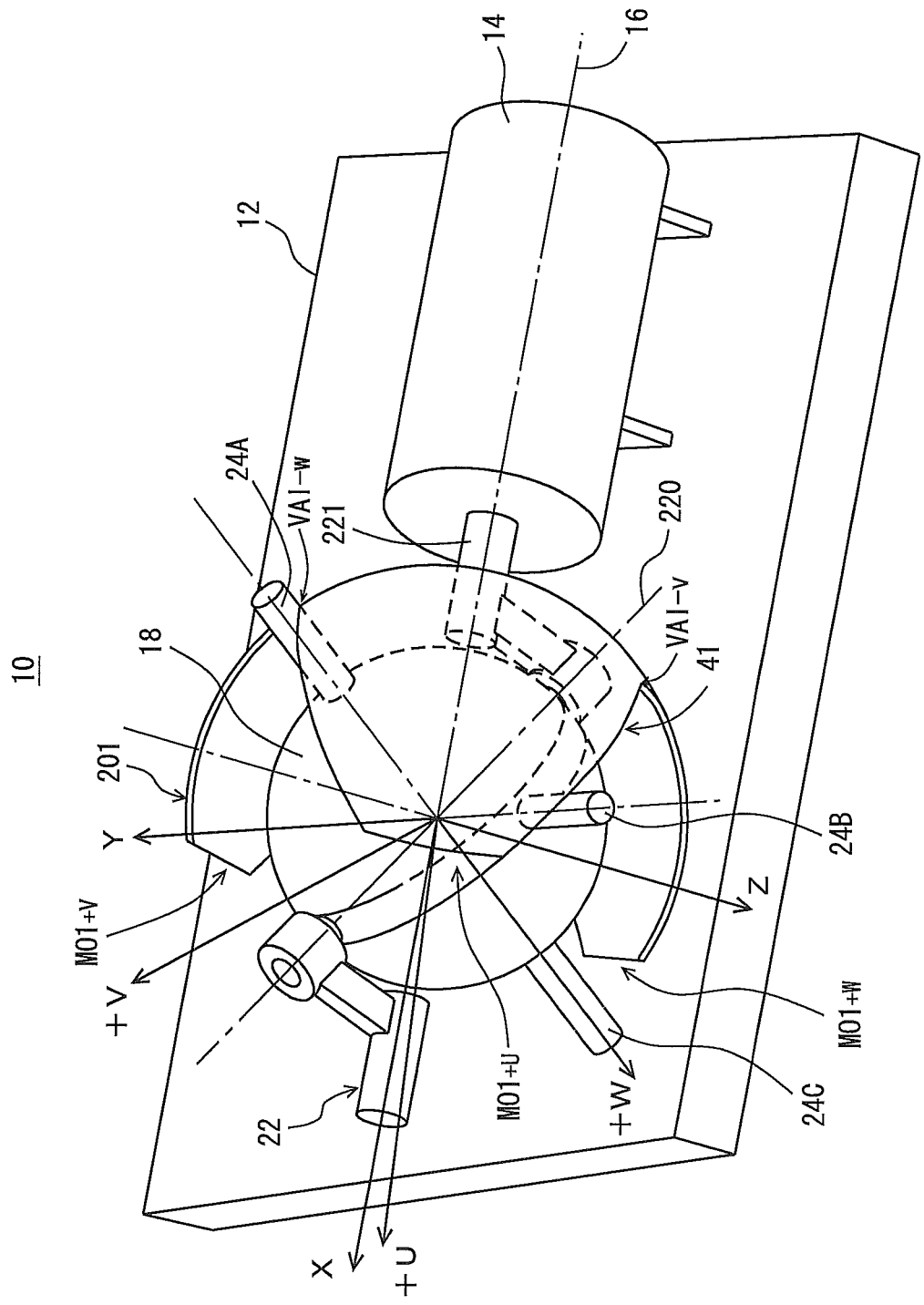
FIG. 24 is a perspective view of an outside structure of another example of the six-direction indicator different from those in FIGS. 1 and 23.

When the rotation member 18 has four guide pins (guide pins 24A to 24D), the tops of the guide members 201 and 202 do not have to be provided on the U, V, and W axes. For example, when the six direction indicator 10 includes only the first guide member 201 as the guide member 20 but not the second guide member 202, and the rotation member 18 includes the four guide pins 24A to 24D, the tops $MO1_{+U}$, $MO1_{+V}$, and $MO1_{+W}$ of the mountain-like portions MO1 at the circumferential edge 41 of the first guide member 201 may be lower than those in FIG. 1 and do not have to correspond to the U, V, and W axes. In FIG. 24, the mountain-like portions MO1 each have a trapezoidal shape having its width gradually reduced from the valley-like portion VA1 toward the top. Note however that the bottoms $VA1_{-U}$, $VA1_{-V}$, and $VA1_{-W}$ correspond to the U, V, and W axes. Even in this arrangement, the guide pin 24A can indicate the six directions (±U, ±V, and ±W directions).

In FIG. 24, the circumferential edge 41 of the first guide member 201 has three mountain-like portions MO1 and three valley-like portions VA1 but there may be two mountain-like portions and two valley-like portions. The two mountain-like portions need only be arranged 60° apart from each other and the two valley-like portions also need only be arranged 60° apart from each other.

In FIG. 2, the shaft 221 is coupled to the rotation member 18 with the crank arm 222 to form the inclined crank mechanism 22 but the crank mechanism 22 may be formed by a crankshaft including the shaft 221, the crank arm 222 and a crank pin provided on the inclined axis 220 and the rotation member 18 having the crank pin of the crankshaft inserted therein and rotatable around the crank pin (i.e., the inclined axis 220).

In the above described embodiment, the inclined crank mechanism 22 includes the two shafts 221 but only one of the shafts 221 may be provided.

Figure 25:
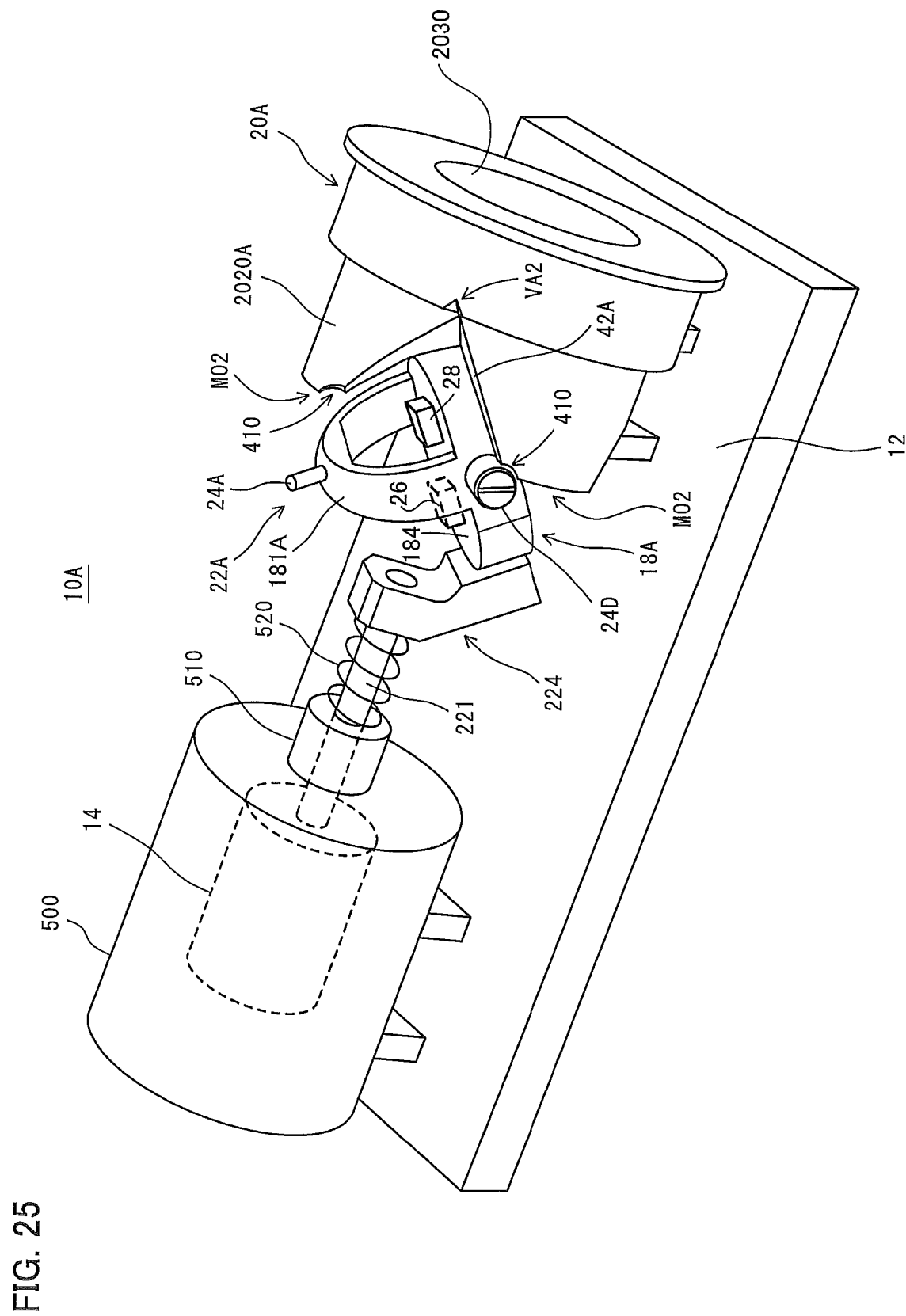
FIG. 25 is a perspective view of an outside structure of another example of the six-direction indicator different from those in FIGS. 1, 23, and 24.
Figure 26:
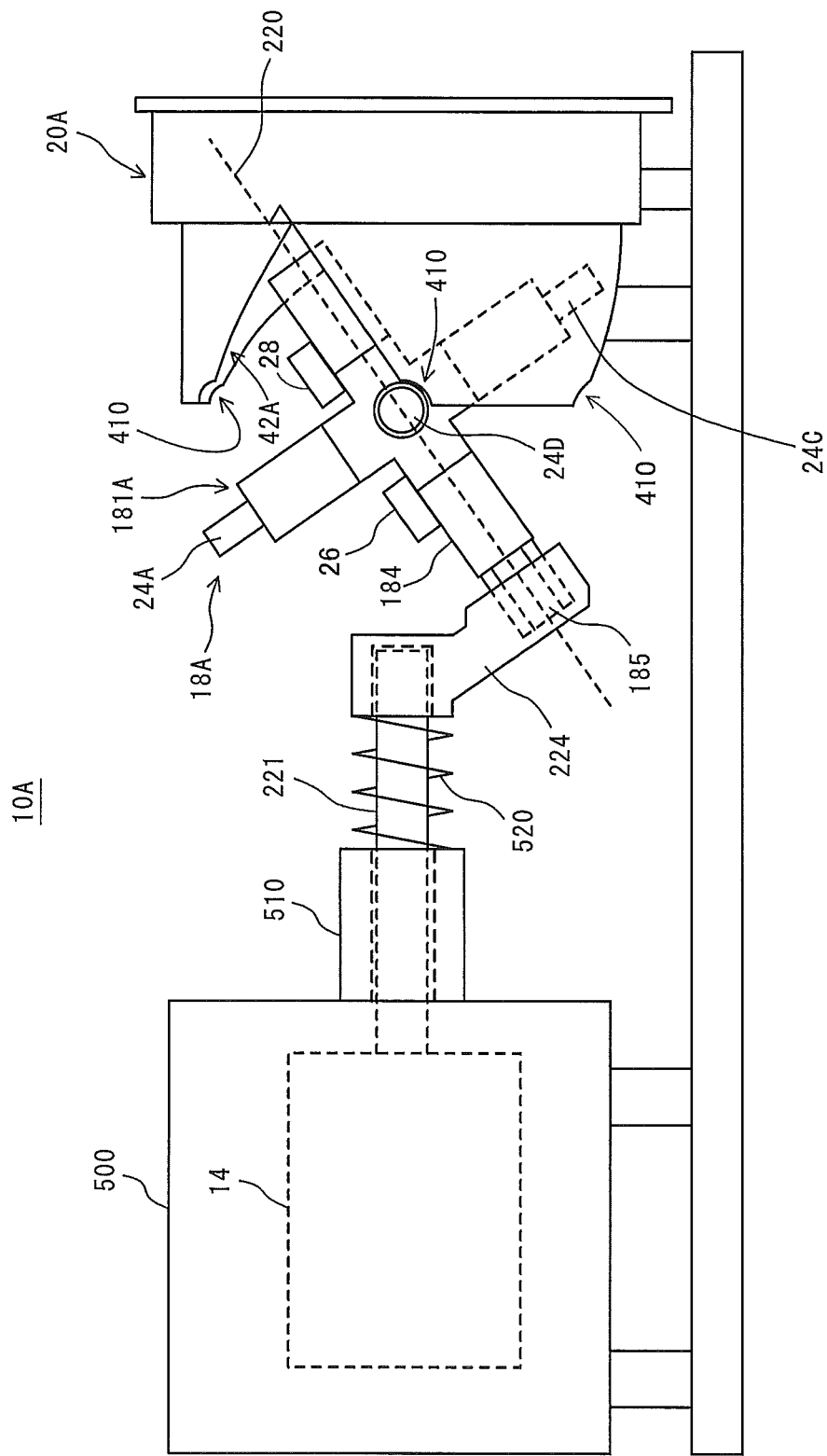
FIG. 26 is a side view of the six-direction indicator shown in FIG. 25.

Referring to FIGS. 25 and 26, a six-direction indicator 10A includes a stepping motor 14, an inclined crank mechanism 22A, and a guide member 20A.

The stepping motor 14 is stored in a motor case 500 and fixed to an inner surface of the motor case 500. The motor case 500 is fixed to the base 12. The shaft 221 is attached at an end of the stepping motor 14.

A guide member 20A is provided on an end side opposite to the stepping motor 14 with the inclined crank mechanism 22 therebetween. The guide member 20A is cylindrical and has openings at both ends. The guide member 20A is fixed to the base 12 similarly to the guide member 20. The guide member 20A has a cylindrical circumferential wall 2020A and a circumferential edge 42A as an end of the circumferential wall 2020A on the side of the inclined crank mechanism 22. The circumferential edge 42A has mountain-like portions MO2 and valley-like portions VA2 formed alternately at intervals of 60° around the X axis.

An opening 2030 is formed at an end of the circumferential wall 2020A on the opposite side to the circumferential edge 42A. A plurality of wirings connected to the inclined crank mechanism 22A are passed through the opening 2030.

The guide member 20A corresponds to the second guide member 202 described above. The tops of the three mountain-like portions MO2 of the circumferential edge 42A do not correspond to the U, V, and W axes and have trapezoidal shapes. On the other hand, the three valley-like portions VA2 of the circumferential edge 42A correspond to the U, W, and V axes.

The inclined crank mechanism 22A includes the shaft 221, an arm member 224, and a rotation member 18A.

The rotation member 18A rotates around an inclined axis that is α° inclined with respect to the shaft 221 similarly to the rotation member 18. The rotation member 18A is coupled to the shaft 221 with the arm 224.

The rotation member 18A includes a disk-shaped substrate 184 similarly to the rotation member 18. The rotation member 18A includes an annular member 181A in place of the inner shell 181. The annular member 181A is formed on the substrate 184 and orthogonal to the substrate 184.

As shown in FIG. 26, one axial member 185 is formed at a side surface of the substrate 184, and the axial member 185 is inserted into a hole formed at a tip end of the arm member 224. In this way, the rotation member 18A is supported rotatably around the inclined axis.

Two guide pins 24B and 24D are provided upright at a side surface of the substrate 184. The guide pins 24B and 24D are provided on a straight line passing the center of the substrate 184. The guide pins 24B and 24D are arranged orthogonally to the inclined axis 220. At the side surface of the annular member 181A, two guide pins 24A and 24D are provided upright on a normal to the substrate 184 that passes through the center of the substrate 184.

Similarly to FIG. 2, the rotational angular velocity sensor 26 and the gravitational acceleration sensor 28 are attached on the substrate 184. The indication directions of these sensors 26 and 28 match the axial direction of the guide pin 24A. More specifically, the guide pin 24A serves as an indication pin that indicates the indication directions of the sensors 26 and 28.

The inclined crank mechanism 22A includes only a single shaft 221. More specifically, the inclined crank mechanism 22A has the shaft 221 only on the side of the stepping motor 14 and does not have the shaft 221 on the side of the guide member 20A.

The six-direction indicator 10A further includes a receiving base 510 and an elastic member 520. The receiving base 510 is provided at an end face of the motor case 500. The receiving base 510 is a cylinder into which the shaft 221 is inserted. The receiving base 510 is fixed to the motor case 500. Therefore, when the shaft 221 is rotated by the stepping motor 14, the receiving base 510 does not rotate.

The elastic member 520 is a spiral spring provided between the receiving base 510 and the arm member 224. The shaft 221 is inserted in the elastic member 520. The elastic member 520 provides the rotation member 18A with force toward the guide member 20A through the arm member 224. The elastic member 520 pushes the rotation member 18A toward the guide member 20A, so that the rotation member 18A is supported stably using the single shaft 221 without providing another shaft 221 on the side of the guide member 20A.

The rotation member 18A rotates as it is pressed against the guide member 20A by the elastic member 520. Therefore, the rotation member 18A is supported stably by the single shaft 221. Since only one shaft 221 and only one guide member are necessary, the six-direction indicator 10A can be made compact as compared to the six-direction indicator 10. Furthermore, a space for providing wirings to be connected to the rotational angular velocity sensor 26 and the gravitational acceleration sensor 28 can be secured easily.

As shown in FIGS. 25 and 26, the circumferential edge 42A has trapezoidal mountain-like portions MO and valley-like portions VA provided alternately at intervals of 60°. The circumferential edge 42A further has depressions 410 at ends of the upper side portions (i.e., the tops) of the mountain-like portions MO. The guide members 24B and 24D are fitted into the depressions 410.

The guide pin 24D and the guide pin 24B (which is not shown in FIGS. 25 and 26) coaxially provided with the guide pin 24D serve as auxiliary pins to allow the guide pin 24A to be provided correctly on the U, V, and W axes. Hereinafter, the guide pins 24B and 24D will be referred to as "auxiliary guide pins 24B and 24D" and the guide pin 24A will be referred to as "indication pin 24A."

The depression 410 is formed in a position where any of the auxiliary pins 24B and 24D contacts the circumferential edge 42A when the indication pin 24A is provided on any of the U, V, and W axes. More specifically, the depression 410 is formed in a position where any of the auxiliary pins 24B and 24D contacts the circumferential edge 42A when the indication pin 24A indicates any of the +U, −U, +V, −V, +W, and −W axes.

When the six-direction indicator 10A starts to operate, the rotation member 18A rotates around the X axis and the inclined axis 220. When for example a tip end of the indication pin 24A indicates the +U direction, one of the auxiliary pins 24B and 24D is fitted in the depression 410. Therefore, the indication pin 24A can indicate the +U axis correctly. Similarly, when the indication pin 24A is provided on any of the U, V, and W axes, one of the auxiliary pins 24B and 24D is fitted into the depression 410 by force applied by the elastic member 520. Therefore, the indication precision of the indication pin 24A improves.

Since the depression 410 is shallow, the auxiliary pins 24B and 24D move easily out of the depression 410 as the stepping motor 14 rotates the shaft 221. The auxiliary pins 24B and 24D then move around on the circumferential edge 42A again.

As shown in FIG. 27, a root part of the auxiliary pin 24D is inserted in a bearing 530. The bearing 530 is fixed at an inner portion of a side surface of the substrate 184. In short, the auxiliary pin 24D is attached to the rotation member 18A in a rotatable manner around the axis of the auxiliary pin 24D. While the six-direction indicator 10A operates, the auxiliary pin 24D moves on the circumferential edge 42A as it is in contact with the circumferential edge 42A. Since the auxiliary pin 24D rotates around the axis of the auxiliary pin 24D, friction between the auxiliary pin 24D and the circumferential edge 42A can be reduced. Similarly to the auxiliary pin 24D, the auxiliary pin 24B has its root portion inserted in a bearing and is attached at the rotation member 18A in a rotatable manner around the axis of the auxiliary pin 24B.

The outside structure and operation of the six-direction indicator are as described above. In the embodiment described above, the circumferential edges 41 and 42 of the guide member 20 are slit type tracks but the track may have any shape other than the slit. For example, in place of the guide member 20 having the track slit 203, a guide without a slit may be provided with a zigzag groove similar to the track slit 203 around the X axis at the inner surface of the guide and the groove may be used as the track. Even in this case, when the tip end of the guide pin 24A contacts the circumferential edge of the groove (track), the above-described operation can be achieved. A rail may be used in place of the track slit 203 and a circumferential edge formed at the top of the rail may be used as a track. More specifically, the guide member 20 is not specifically limited as long as the guide member has a circumferential edge contacted by the guide pin 24 while the pin goes around the X axis.

According to the embodiment described above, the shape of the track slit 203 when viewed from the front of the device (i.e., the shape of circumferential edge 41 of the guide member 201) is circular, but the shape of the track slit 203 may have any other shapes. For example, the shape of the track slit 203 when viewed from the front of the device may be a hexagonal shape or any other shape as far as a bent track having an alternate arrangement of mountain like shapes and valley like shapes at intervals of 60° around the X axis.

In the six-direction indicator 10A shown in FIGS. 25 and 26, the elastic member may be a plate spring or rubber in place of the spiral spring. The elastic member may be provided on the side of the guide member 20A and the rotation member 18A may be pulled by the elastic member to be pressed against the circumferential edge 42A. In short, the elastic member is not particularly specified as far as it provides the rotation member with force in the direction of said guide member.

In the six direction indicator 10A, the depression 410 is formed where one of the auxiliary pins 24B and 24D contacts the circumferential edge 42A when the indication pin 24A is provided on any of the U, V, and W axes. However, the position of the depression 410 is not limited to the position in this example. For example, when the circumferential edge 42A of the six-direction indicator 10A has mountain-like portions MO2 having tops corresponding to the U, V, and W axes and the guide pin 24A is provided on one of the U, V, and W axes, a depression may be formed in a position where the guide pin 24C provided 180° apart from the guide pin 24A around the inclined axis 220 contacts the circumferential edge 42A. When the guide pin 24A is provided on any of the U, V, and W axes, a depression may be formed in a position where the guide pin 24A and the circumferential edge 42A contact with each other. In short, the above described effects are provided when the rotation member 18 includes a plurality of guide pins 24A to 24D provided 90° or 180° apart from one another around the inclined axis 220, the guide pin 24A indicates any of the U, V, and W axes, and a depression is formed in a position where any of the guide pins 24A to 24D contacts the circumferential edge 42A.

Angles α and β

Now, the reason why the elevation angle α is preferably from 30° to 40°, most preferably 35.26° and the crossing angle β is most preferably 90° will be described.

The tip end positions $i_U$, $i_V$, and $i_W$ of the U, V, and W axes are represented by the following Expression (7) in the XYZ rectangular coordinate system.

$$i_U = \begin{bmatrix} \sin\alpha \\ -\frac{\sqrt{3}\cos\alpha}{2} \\ -\frac{\cos\alpha}{2} \end{bmatrix}, i_V = \begin{bmatrix} \sin\alpha \\ \frac{\sqrt{3}\cos\alpha}{2} \\ -\frac{\cos\alpha}{2} \end{bmatrix}, i_W = \begin{bmatrix} \sin\alpha \\ 0 \\ \cos\alpha \end{bmatrix}, \quad (7)$$

The crossing angle β on the U, V, and W axes, which is derived from the inner product of the above described column vectors, is represented by the following Expression (8):

$$\cos\beta = \sin^2\alpha - \frac{\cos^2\alpha}{2} \quad (8)$$

$$\therefore \beta = \cos^{-1}\left(\sin^2\alpha - \frac{\cos^2\alpha}{2}\right)$$

Figure 28:
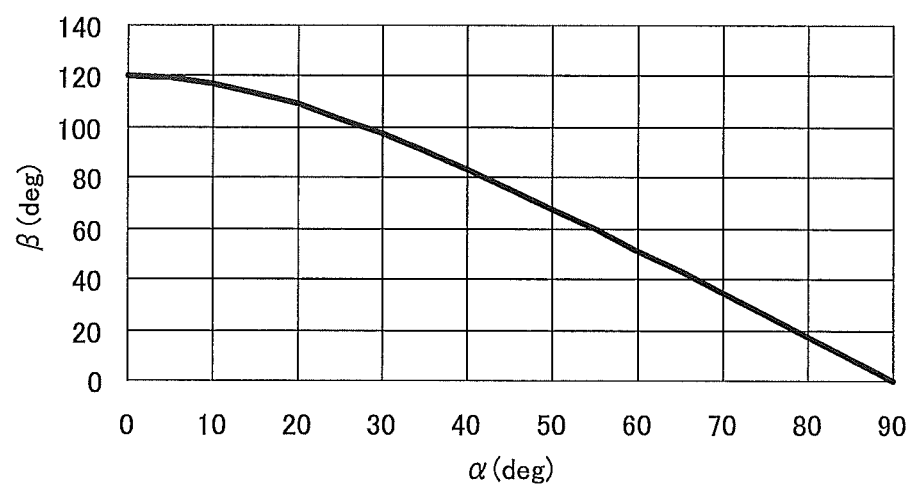
FIG. 28 is a graph showing a relation between an elevation angle α and a crossing angle β in XYZ and UVW coordinate systems shown in FIGS. 4A and 4B.

FIG. 28 is a plot in which the abscissa represents the elevation angle α and the ordinate represents the crossing angle β. As can be clearly understood from FIG. 28, when the elevation angle α is 0°, the crossing angle β is 120°, and when the elevation angle α is 90°, the crossing angle β is 0°.

Here, from Expression (7), rotational angular velocity components $\omega_U$, $\omega_V$, and $\omega_W$ around the U, V, and W axes are represented by the following Expression (9) using rotational angular velocity components $\omega_X$, $\omega_Y$, and $\omega_Z$ around the X, Y, and Z axes.

$$\begin{bmatrix} \omega_U \\ \omega_V \\ \omega_W \end{bmatrix} = A \begin{bmatrix} \omega_X \\ \omega_Y \\ \omega_Z \end{bmatrix} \quad (9)$$

$$A = \begin{bmatrix} \sin\alpha & -\frac{\sqrt{3}\cos\alpha}{2} & -\frac{\cos\alpha}{2} \\ \sin\alpha & \frac{\sqrt{3}\cos\alpha}{2} & -\frac{\cos\alpha}{2} \\ \sin\alpha & 0 & \cos\alpha \end{bmatrix}$$

$$|A| = \frac{\sqrt{3}}{2}\cos^2\alpha\sin\alpha + \frac{\sqrt{3}}{4}\cos^2\alpha\sin\alpha + 0 +$$

$$\frac{\sqrt{3}}{4}\cos^2\alpha\sin\alpha + \frac{\sqrt{3}}{4}\cos^2\alpha\sin\alpha - 0 = \frac{3\sqrt{3}}{2}\cos^2\alpha\sin\alpha$$

In Expression (9), A is a coordinate transformation matrix from the XYZ rectangular coordinate system to the UVW coordinate system and |A| is the determinant of the coordinate transformation matrix A.

Now, a rotational angular velocity ω will be described by way of illustration while the same applies to a gravitational acceleration g. More specifically, if gravitational acceleration components in the X, Y, and Z directions are $g_X$, $g_Y$, and $g_Z$, gravitational acceleration components $g_U$, $g_V$, and $g_W$ in the U, V, and W directions are represented similarly by Expression (9).

When $\alpha=0$ or 90, $|A|=0$ results, and therefore there is no inverse matrix for the matrix A. Otherwise, the inverse matrix C of the matrix A is represented by the following Expression (10):

$$C \equiv A^{-1} \qquad (10)$$

$$= \frac{2}{3\sqrt{3}\cos^2\alpha\sin\alpha} \begin{bmatrix} \frac{\sqrt{3}\cos^2\alpha}{2} & \frac{\sqrt{3}\cos^2\alpha}{2} & \frac{\sqrt{3}\cos^2\alpha}{2} \\ -\frac{3\cos\alpha\sin\alpha}{2} & \frac{3\cos\alpha\sin\alpha}{2} & 0 \\ -\frac{\sqrt{3}\cos\alpha\sin\alpha}{2} & -\frac{\sqrt{3}\cos\alpha\sin\alpha}{2} & \sqrt{3}\cos\alpha\sin\alpha \end{bmatrix}$$

$$= \begin{bmatrix} \frac{1}{3\sin\alpha} & \frac{1}{3\sin\alpha} & \frac{1}{3\sin\alpha} \\ -\frac{1}{\sqrt{3}\cos\alpha} & \frac{1}{\sqrt{3}\cos\alpha} & 0 \\ -\frac{1}{3\cos\alpha} & -\frac{1}{3\cos\alpha} & \frac{2}{3\cos\alpha} \end{bmatrix}$$

As for a normal coordinate transformation matrix between rectangular coordinate systems, an inverse matrix is the transposed matrix of the original matrix, but in this case, unlike a normal coordinate transformation matrix, the inverse matrix C is not the transposed matrix of the matrix A.

From Expressions (9) and (10), the rotational angular velocity components $\omega_X$, $\omega_Y$, and $\omega_Z$ around the X, Y, Z, axes are represented by the following Expression (11):

$$\begin{bmatrix} \omega_X \\ \omega_Y \\ \omega_Z \end{bmatrix} = \begin{bmatrix} \frac{1}{3\sin\alpha} & \frac{1}{3\sin\alpha} & \frac{1}{3\sin\alpha} \\ -\frac{1}{\sqrt{3}\cos\alpha} & \frac{1}{\sqrt{3}\cos\alpha} & 0 \\ -\frac{1}{3\cos\alpha} & -\frac{1}{3\cos\alpha} & \frac{2}{3\cos\alpha} \end{bmatrix} \begin{bmatrix} \omega_U \\ \omega_V \\ \omega_W \end{bmatrix} \qquad (11)$$

$$\therefore \omega_X = \frac{\omega_U + \omega_V + \omega_W}{3\sin\alpha}$$

$$\omega_Y = \frac{-\omega_U + \omega_V}{\sqrt{3}\cos\alpha}$$

$$\omega_Z = \frac{-\omega_U - \omega_V + 2\omega_W}{3\cos\alpha}$$

Now, measurement errors by the rotational angular velocity sensor 26 and the gravitational acceleration sensor 28 will be described.

A differentiation of Expression (11) results in the following Expression (12).

$$\delta\omega_X = \frac{\delta\omega_U + \delta\omega_V + \delta\omega_W}{3\sin\alpha} \qquad (12)$$

$$\delta\omega_Y = \frac{-\delta\omega_U - \delta\omega_V}{\sqrt{3}\cos\alpha}$$

$$\delta\omega_Z = \frac{-\delta\omega_U - \delta\omega_V + 2\delta\omega_W}{3\cos\alpha}$$

Since $\delta\omega_X$, $\delta\omega_Y$, and $\delta\omega_Z$ are independent from one another, the expectations of square mean of the left sides of Expression (12) $\langle\delta\omega_X^2\rangle$, $\langle\delta\omega_Y^2\rangle$, and $\langle\delta\omega_Z^2\rangle$ are represented by the following Expression (13):

$$\langle\delta\omega_X^2\rangle = \frac{\langle\delta\omega_U^2\rangle + \langle\delta\omega_V^2\rangle + \langle\delta\omega_W^2\rangle}{9\sin^2\alpha} \qquad (13)$$

$$\langle\delta\omega_Y^2\rangle = \frac{\langle\delta\omega_U^2\rangle + \langle\delta\omega_V^2\rangle}{3\cos^2\alpha}$$

$$\langle\delta\omega_Z^2\rangle = \frac{\langle\delta\omega_U^2\rangle + \langle\delta\omega_V^2\rangle + \langle\delta\omega_W^2\rangle}{9\cos^2\alpha}$$

Provided that errors are the same among the U, V, and W axes, if $\langle\delta\omega_U^2\rangle$, $\langle\delta\omega_V^2\rangle$, $\langle\delta\omega_W^2\rangle\equiv\langle\delta\omega^2\rangle$ in Expression (13), the following Expression (14) is obtained.

$$\langle\delta\omega_X^2\rangle = \frac{\langle\delta\omega^2\rangle}{3\sin^2\alpha} \qquad (14)$$

$$\langle\delta\omega_Y^2\rangle = \frac{2\langle\delta\omega^2\rangle}{3\cos^2\alpha}$$

$$\langle\delta\omega_Z^2\rangle = \frac{2\langle\delta\omega^2\rangle}{3\cos^2\alpha}$$

By making Expression (14) dimensionless, error evaluation functions f1 and f2 in the X, Y, and Z directions are represented by the following Expression (15):

$$f_1 \equiv \sqrt{\frac{\langle\delta\omega_X^2\rangle}{\langle\delta\omega^2\rangle}} = \frac{1}{\sqrt{3}\sin\alpha} \qquad (15)$$

$$f_2 \equiv \sqrt{\frac{\langle\delta\omega_Y^2\rangle}{\langle\delta\omega^2\rangle}} = \sqrt{\frac{\langle\delta\omega_Z^2\rangle}{\langle\delta\omega^2\rangle}} = \frac{\sqrt{2}}{\sqrt{3}\cos\alpha}$$

From Expression (15), the error in the Y direction and the error in the Z direction are equal. This can be expected from the symmetry between the Y axis and the Z axis shown in FIGS. 4A and 4B.

Figure 29:
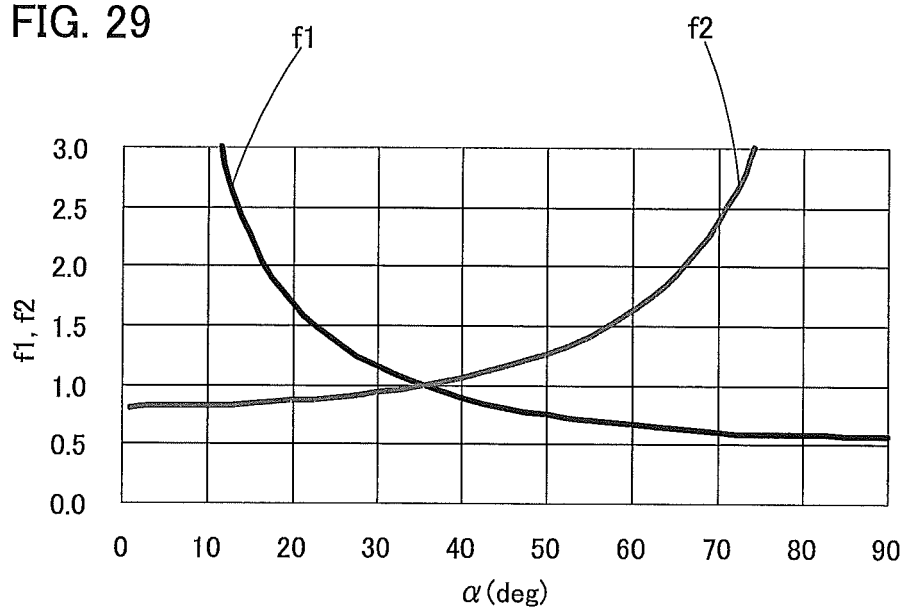
FIG. 29 is a graph showing a relation between an error evaluation function f1 in the X direction and an error evaluation function f2 in the Z direction and the elevation angle α.

FIG. 29 is a plot in which the abscissa represents the elevation angle $\alpha$ and the ordinate represents the error evaluation functions f1 and f2. As can be clearly understood from FIG. 29, if $\alpha=0$, f1=$\infty$ results. This is because measurement in the Y and Z directions is disabled in this case.

From Expression (15), the elevation angle $\alpha$ when f1=f2 is represented by the following Expression (16):

$$\frac{1}{\sqrt{3}\sin\alpha} = \frac{\sqrt{2}}{\sqrt{3}\cos\alpha} \qquad (16)$$

$$\therefore \frac{\sin\alpha}{\cos\alpha} = \tan\alpha = \frac{1}{\sqrt{2}}$$

$$\therefore \alpha = \tan^{-1}\left(\frac{1}{\sqrt{2}}\right) = 35.26(deg)$$

Figure 30:
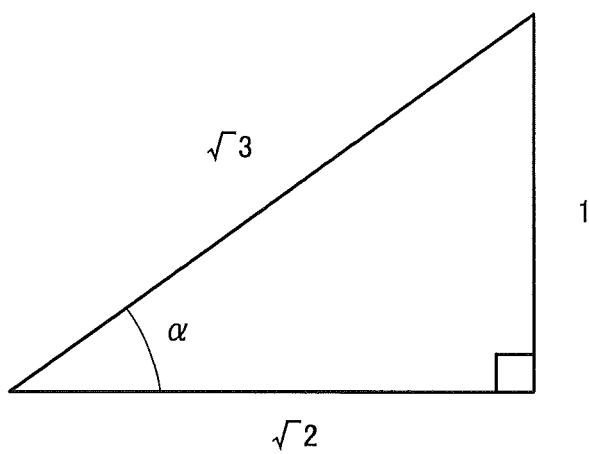
FIG. 30 shows a right triangle where α is 35.26°.

The relation of Expression (16) is shown in FIG. 30. The following Expression (17) is derived from FIG. 30.

$$\cos\alpha = \frac{\sqrt{2}}{\sqrt{3}} \qquad (17)$$

$$\sin\alpha = \frac{1}{\sqrt{3}}$$

Therefore, the coordinate transformation matrix C in this case is represented by the following Expression (18):

$$C = \begin{bmatrix} \frac{1}{\sqrt{3}} & \frac{1}{\sqrt{3}} & \frac{1}{\sqrt{3}} \\ -\frac{1}{\sqrt{2}} & \frac{1}{\sqrt{2}} & 0 \\ -\frac{1}{\sqrt{6}} & -\frac{1}{\sqrt{6}} & \sqrt{\frac{2}{3}} \end{bmatrix} \quad (18)$$

From Expression (8), the crossing angle β in this case is represented by the following Expression (19):

$$\beta = \cos^{-1}\left(\sin^2\alpha - \frac{\cos^2\alpha}{2}\right) = \cos^{-1}\left(\frac{1}{3} - \frac{1}{2} \times \frac{2}{3}\right) = \cos^{-1}0 \quad (19)$$

$$\therefore \beta = 90(deg)$$

Since the crossing angle β is 90°, the UVW coordinate system in this case is a rectangular coordinate system.

When the elevation angle α is shifted from 35.26°, how much the error evaluation functions f1 and f2 of Expression (15) are shifted is represented by the following Expression (20):

$$\frac{f_2}{f_1} - 1 = \frac{\frac{\sqrt{2}}{\sqrt{3}\cos\alpha}}{\frac{1}{\sqrt{3}\sin\alpha}} - 1 = \sqrt{2}\tan\alpha - 1 \quad (20)$$

Figure 31:
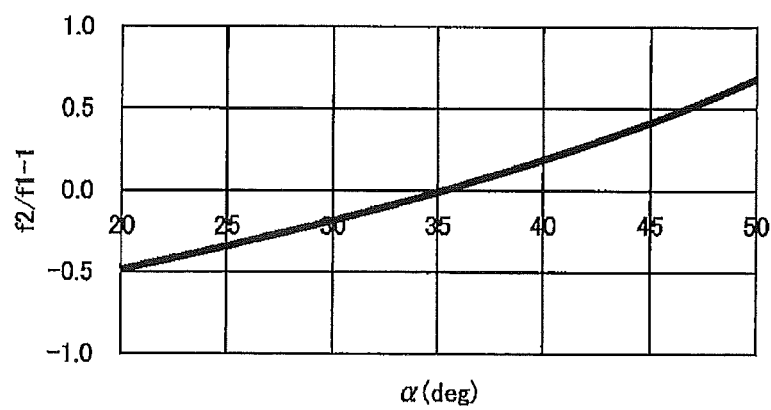
FIG. 31 is a graph showing a relation between f2/f1−1 and the elevation angle α.

FIG. 31 is a plot where the abscissa represents the elevation angle α and the ordinate represents the value of Expression (20). As can be clearly understood from FIG. 31, when the elevation angle α is from 30° to 40°, the errors among the U, V, and W axes are not more than about 20%.

Now, effects on azimuth angle errors will be described.

The rotational angular velocity Ω and the gravitational acceleration G of the earth are represented by the following Expression (21):

$$\Omega = \sqrt{\omega_X^2 + \omega_Y^2 + \omega_Z^2}$$

$$G = \sqrt{g_X^2 + g_Y^2 + g_Z^2}$$

Figure 32C:
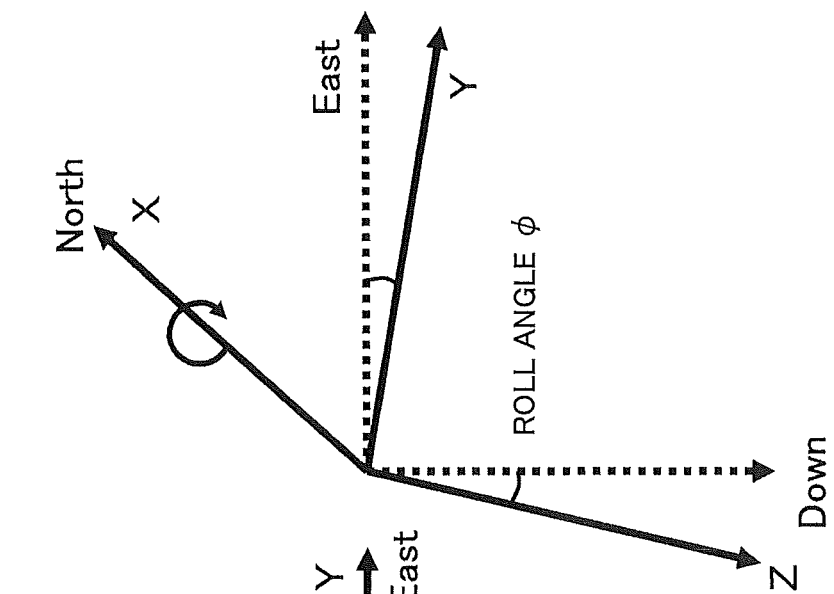
FIG. 32C is a view showing the roll angle φ of the six-direction indicator shown in FIG. 1.
Figure 32B:
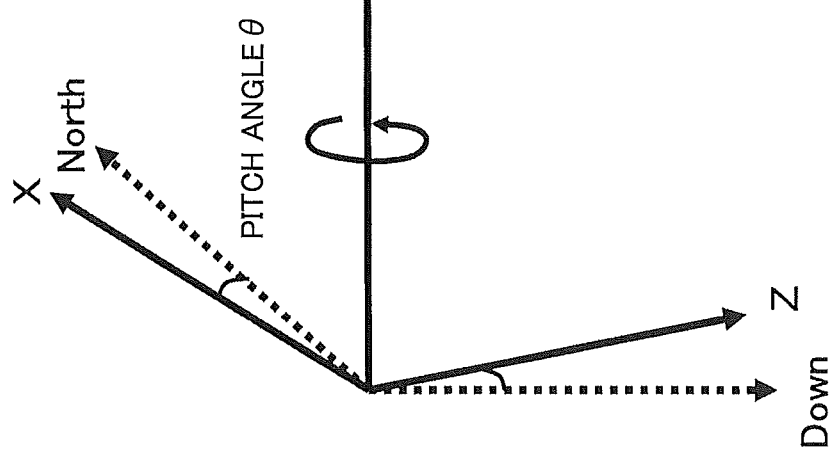
FIG. 32B is a view showing the pitch angle θ of the six-direction indicator shown in FIG. 1.
Figure 32A:
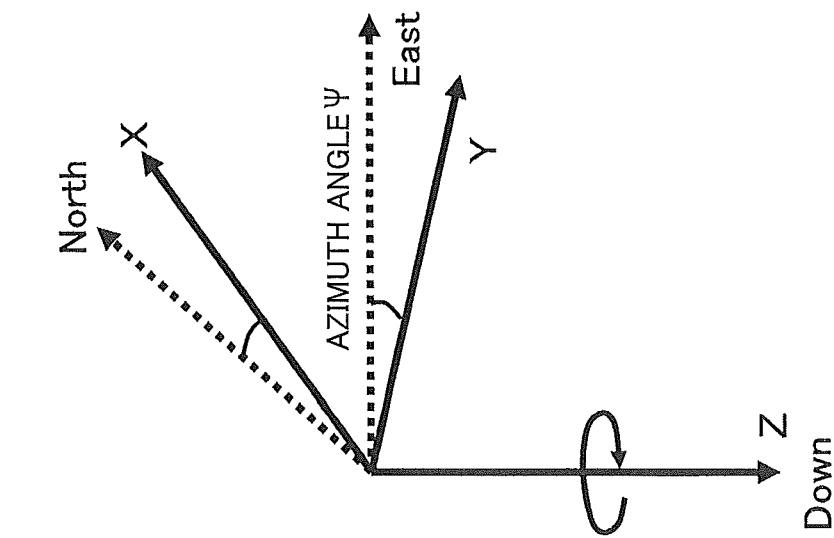
FIG. 32A is a view showing the azimuth angle Ψ of the six-direction indicator shown in FIG. 1.

The attitude of the six direction indicator 10 is represented by an Eulerian angle (an azimuth angle Ψ, a pitch angle θ and a roll angle φ) shown in FIG. 32. As shown in FIG. 32A, if rotation is positive in the clockwise direction toward the vertical direction Down (or the +Z direction), the azimuth angle Ψ is formed by the north direction North and the +X direction (or the east direction East and the +Y direction). As shown in FIG. 32B, if rotation is positive in the clockwise direction toward the east direction East (or the +Y direction), the pitch angle θ is formed by the north direction North and the +X direction (or the vertical direction Down and the +Z direction). As shown in FIG. 32C, if rotation is positive in the clockwise direction toward the north direction North (or the +X direction), the roll angle φ is formed by the east direction East and the +Y direction (or the vertical direction Down and the +Z direction).

The roll angle φ, the pitch angle θ, and the azimuth angle Ψ are represented by the following Expression (22):

$$\phi = \tan^{-1}\left(\frac{g_Y}{g_Z}\right) \quad (22)$$

$$\theta = -\sin^{-1}\left(\frac{g_X}{G}\right)$$

$$\psi = -\tan^{-1}\left(\frac{-\omega_Y\cos\phi + \omega_Z\sin\phi}{\omega_X\cos\theta - \omega_Y\sin\phi\sin\theta + \omega_Z\cos\theta\sin\theta}\right)$$

The latitude λ of the location where the six direction indicator 10 is provided is represented by the following Expression (23):

$$\lambda = -\sin^{-1}\left(\frac{\omega_X\sin\theta - \omega_Y\sin\phi\cos\theta - \omega_Z\cos\phi\cos\theta}{\Omega}\right) \quad (23)$$

Therefore, the information processor 30 shown in FIG. 15 may further include a roll angle calculator, a pitch angle calculator, and a latitude calculator.

From Expressions (21) to (23), the relation between an error of the azimuth angle Ψ and a measurement error of the rotational angular velocity sensor 26 is represented by the following Expression (24):

$$\langle\delta\psi^2\rangle = \frac{(\cos\theta\sin\psi)^2\langle\delta\omega_X^2\rangle + (\cos\phi\cos\psi + \sin\phi\sin\theta\sin\psi)^2\langle\delta\omega_Y^2\rangle + (\sin\phi\cos\psi - \cos\phi\sin\theta\sin\psi)^2\langle\delta\omega_Z^2\rangle}{(\Omega c\lambda)^2} \quad (24)$$

Substituting Expression (14) in Expression (24) yields the following Expression (25):

$$\langle\delta\psi^2\rangle = \frac{\langle\delta\omega^2\rangle}{(\Omega\cos\lambda)^2}\left[\frac{(\cos\theta\sin\psi)^2}{3\sin^2\alpha} + \frac{2(\cos\phi\cos\psi + \sin\phi\sin\theta\sin\psi)^2}{3\cos^2\alpha} + \frac{2(\sin\phi\cos\psi - \cos\phi\sin\theta\sin\psi)^2}{3\cos^2\alpha}\right] \quad (25)$$

$$= \frac{\langle\delta\omega^2\rangle}{(\Omega\cos\lambda)^2}\left[\frac{\cos^2\theta\sin^2\psi}{3\sin^2\alpha} + \frac{2(\cos^2\psi + \sin^2\theta\sin^2\psi)}{3\cos^2\alpha}\right]$$

$$\therefore f(\alpha, \theta, \omega) \equiv \sqrt{\frac{\langle\delta\psi^2\rangle}{\langle\delta\omega^2\rangle/(\Omega\cos\lambda)^2}}$$

$$= \sqrt{\frac{\cos^2\theta\sin^2\psi}{3\sin^2\alpha} + \frac{2(\cos^2\psi + \sin^2\theta\sin^2\psi)}{3\cos^2\alpha}}.$$

Figure 33:
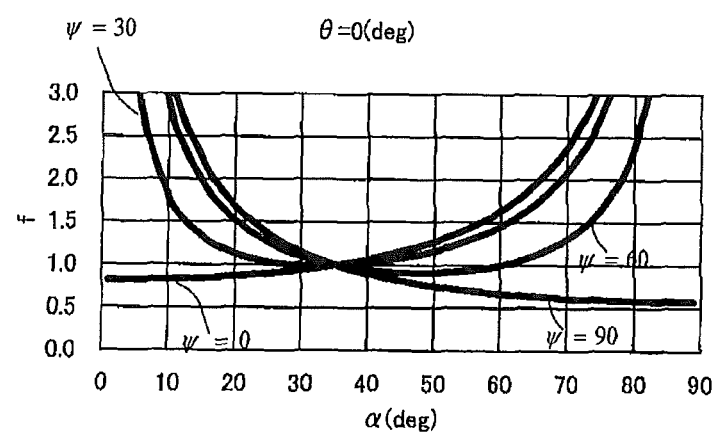
FIG. 33 is a graph showing a relation between an azimuth angle error evaluation function f and the elevation angle α when θ=0°.
Figure 34:
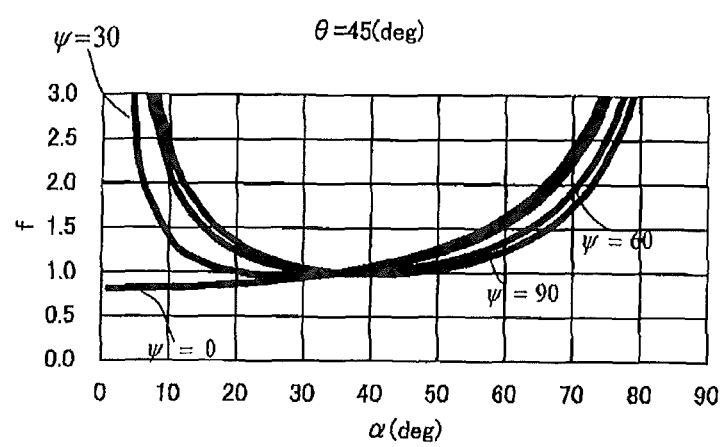
FIG. 34 is a graph showing a relation between an azimuth angle error evaluation function f and the elevation angle α when 0 is 45°.

As can be clearly understood from the azimuth angle error evaluation function f in Expression (25), the azimuth angle error δΨ changes depending on the attitude (the azimuth angle Ψ and the pitch angle θ) of the six direction indicator 10. FIGS. 33 and 34 show a plot where the abscissa represents the elevation angle α and the ordinate represents the azimuth angle error evaluation function f. FIG. 33 shows a case in which θ=0 and FIG. 34 shows a case in which θ=45. As can be clearly understood from FIGS. 33 and 34, when the elevation angle α is within the range from 30° to 40°, the error is relatively small. When α is 35.26, in particular, the following Expression (26) is obtained from Expression (25).

$$\sqrt{\langle\delta\psi^2\rangle} \to \sqrt{\frac{\langle\delta\omega^2\rangle}{(\Omega\cos\lambda)^2}\left[\frac{\cos^2\theta\sin^2\psi}{3\times\frac{1}{3}} + \frac{2(\cos^2\psi+\sin^2\theta\sin^2\psi)}{3\times\frac{2}{3}}\right]} \quad (26)$$

$$= \sqrt{\frac{\langle\delta\omega^2\rangle}{(\Omega\cos\lambda)^2}[\cos^2\theta\sin^2\psi + (\cos^2\psi+\sin^2\theta\sin^2\psi)]}$$

$$= \sqrt{\frac{\langle\delta\omega^2\rangle}{(\Omega\cos\lambda)^2}[(\cos^2\theta+\sin^2\theta)\sin^2\psi + \cos^2\psi]}$$

$$= \sqrt{\frac{\langle\delta\omega^2\rangle}{(\Omega\cos\lambda)^2}[\sin^2\psi + \cos^2\psi]}$$

$$= \frac{\sqrt{\langle\delta\omega^2\rangle}}{(\Omega\cos\lambda)}$$

As can be clearly understood from Expression (26), the azimuth angle error $\delta\Psi$ in this case is constant without being affected by the attitude of the six-direction indicator 10.

As in the foregoing, the elevation angle $\alpha$ in the UVW coordinate system is preferably from 30° to 40°. The crossing angle $\beta$ in this case is from about 100° to 80° from FIG. 28. The elevation angle $\alpha$ is most preferably 35.26°. At the time, the crossing angle $\beta$ is 90° and the UVW coordinate system is a rectangular coordinate system.

When the UVW coordinate system is a rectangular coordinate system, measurement errors are the same regardless of its positional relation with the XYZ coordinate system. Now, an envelope in the lengthwise direction (X direction) in this example will be described.

When the elevation angle is $\alpha$, the tip end positions $i_U$, $i_V$, and $i_W$ of the unit vectors of the U, V, and W axes are represented by the following Expression (27) in the XYZ coordinate system.

$$i_U = \begin{bmatrix}\frac{\cos\alpha}{\sqrt{2}}\\-\frac{1}{\sqrt{2}}\\-\frac{\sin\alpha}{\sqrt{2}}\end{bmatrix}, i_V = \begin{bmatrix}\frac{\cos\alpha}{\sqrt{2}}\\\frac{1}{\sqrt{2}}\\\frac{\sin\alpha}{\sqrt{2}}\end{bmatrix}, i_W = \begin{bmatrix}\sin\alpha\\0\\\cos\alpha\end{bmatrix} \quad (27)$$

Figure 35A:
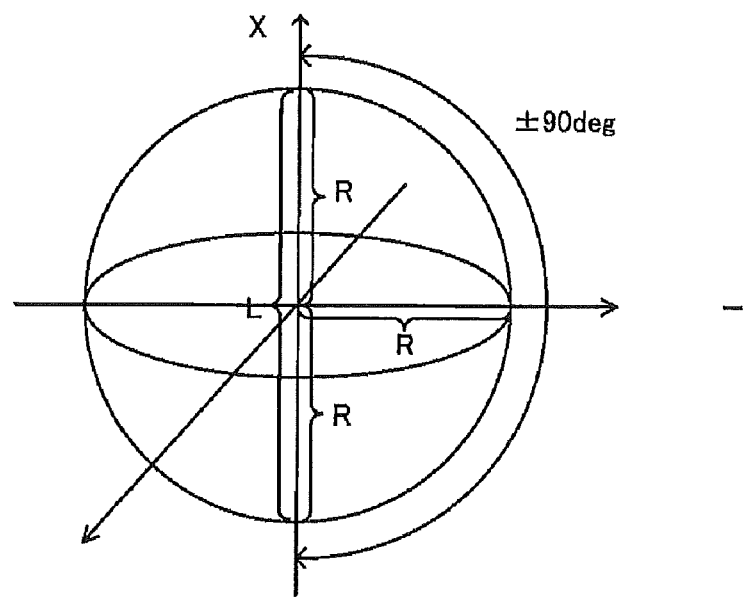
FIG. 35A shows an envelope when a conventional azimuth indicator rotates a rotational angular velocity sensor and a gravitational acceleration sensor.
Figure 35B:
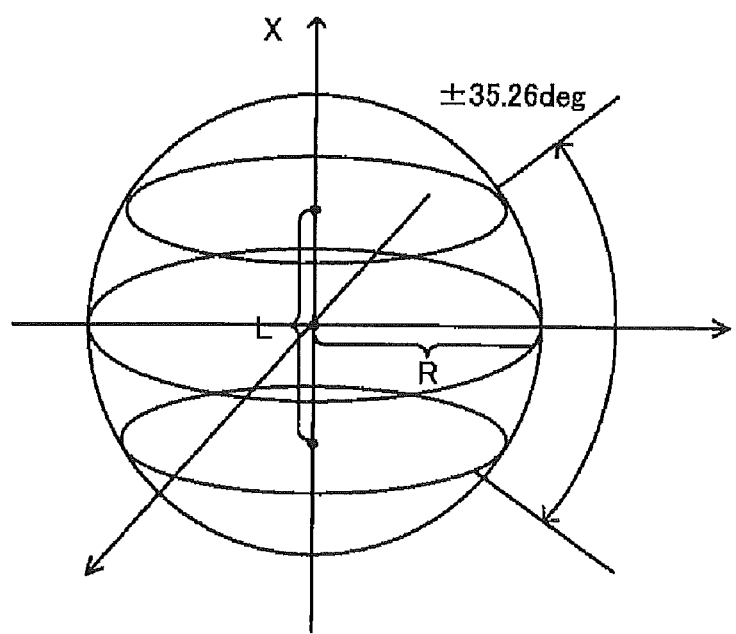
FIG. 35B shows an envelope when the six-direction indicator shown in FIG. 1 rotates the rotational angular velocity sensor and the gravitational acceleration sensor.

As shown in FIGS. 35A and 35B, when an envelope in the X direction is L and the radius of gyration of a vector is R, the ratio L/R is represented by the following Expression (28) in consideration of six directions including the positive and negative directions on the U, V, and W axes.

$$\frac{L}{R} = 2\times\max\left(\frac{\cos\alpha}{\sqrt{2}}, \sin\alpha\right) \quad (28)$$

Figure 36:
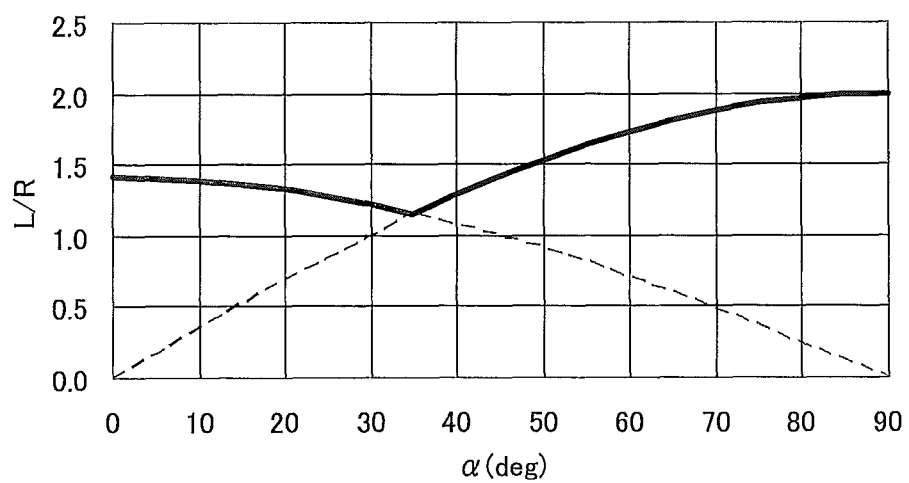
FIG. 36 is a graph showing a relation between L/R and the elevation angle α shown in FIG. 35.

FIG. 36 is a plot where the abscissa represents the elevation angle $\alpha$ and the ordinate represents L/R in Expression (28). As can be clearly understood from FIG. 36, when $\alpha=0$, the W axis is in a YZ plane and matches the Z axis. When $\alpha=90$, the W axis is orthogonal to the YZ plane and matches the X axis, while the U and W axes are within the YZ plane.

From Expression (28) and FIG. 36, L/R is minimized when $\alpha=35.26$ as in the following Expression (29):

$$\frac{\cos\alpha}{\sqrt{2}} = \sin\alpha \quad (29)$$

$$\therefore \frac{\sin\alpha}{\cos\alpha} = \tan\alpha = \frac{1}{\sqrt{2}}$$

$$\therefore \alpha = \tan^{-1}\left(\frac{1}{\sqrt{2}}\right) = 35.26(deg)$$

From Expression (27), the tip end positions $i_U$, $i_V$, and $i_W$ of the unit vectors on the U, V, and W axes are represented by the following Expression (30). They correspond to the first, second, and third columns of Expression (18).

$$i_U = \begin{bmatrix}\frac{1}{\sqrt{3}}\\-\frac{1}{\sqrt{2}}\\-\frac{1}{\sqrt{6}}\end{bmatrix}, i_V = \begin{bmatrix}\frac{1}{\sqrt{3}}\\\frac{1}{\sqrt{2}}\\-\frac{1}{\sqrt{6}}\end{bmatrix}, i_W = \begin{bmatrix}\frac{1}{\sqrt{3}}\\0\\\sqrt{\frac{2}{3}}\end{bmatrix} \quad (30)$$

As in the foregoing, according to the present embodiment, the shaft 221, the rotation member 18, and the guide member 20 interact with one another, so that the rotational angular velocity sensor 26 and the gravitational acceleration sensor 28 can be made to indicate all the axial directions of the UVW coordinate system ($\pm$U, $\pm$V, and $\pm$W directions: six directions in total) by rotating the shaft 221 using a single driving source (the stepping motor 14 in this embodiment). Furthermore, since the rotational angular velocity sensor 26 and the gravitational acceleration sensor 28 swing only $\pm$35.26°, the rotation angle is small and a large space is not necessary for rotation. This allows the device to be compact.

When the UVW coordinate system is a rectangular coordinate system and the elevation angle $\alpha$ is 35.26°, measurement errors for rotational angular velocity components $\omega_X$, $\phi_Y$, and $\omega_Z$ in the XYZ rectangular coordinate system are equal among one another, and measurement errors for gravitational velocity components $g_X$, $g_Y$, and $g_Z$ in the XYZ rectangular coordinate system are equal among one another. An measurement error for the azimuth angle $\Psi$ becomes smaller, independent of the attitude of the six-direction indicator 10. Since the six-direction indicator 10 can be set in an arbitrary attitude, a reference such as a horizontal plane is not necessary and an azimuth can be measured easily.

Not only the azimuth angle $\Psi$ but also the latitude of a place where the six-direction indicator 10 is provided can be measured correctly. In addition, not only the azimuth angle but also a roll angle $\phi$ and a pitch angle $\theta$ are calculated, so that the attitude of the provided six-direction indicator 10 can be measured.

In any of the U, V, and W axes, the rotational angular velocities ($\omega_U$, $\omega_V$, and $\omega_W$) and the gravitational accelerations ($g_U$, $g_V$, and $g_W$) measured in the + and − directions are averaged, so that a bias unique to the six-direction indicator 10 is cancelled and measurement errors can be reduced.

According to the above-described embodiment, the six-direction indicator samples a rotational angular velocity component and a gravitational acceleration component in each of the U, V, and W axes. However, the six-direction indicator may sample these components only in two or one of the U, V, and W axes.

In FIG. 16, in each of steps S1 to S6, the six-direction indicator 10 has the shaft 221 rotate anti-clockwise when viewed from the front of the device (i.e., in the −X direction) but the shaft may be rotated clockwise.

According to the above-described embodiment, the six-direction indicator includes the rotational angular velocity sensor 26 and the gravitational acceleration sensor 28 and serves as an azimuth measuring device. However, the six-direction indicator can be used for purposes other than the azimuth measuring device.

For example, if a CCD camera arranged to shoot in the direction of the guide pin 24A is provided on the rotation member 18 in place of the rotational angular velocity sensor 26 and the gravitational acceleration sensor 28, the six-direction indicator can be used as a surveillance camera capable of covering the six directions. The six-direction indicator can be used as a receiving antenna. In short, the six-direction indicator according to the present invention can be used for all the purposes that necessitate a device provided on a rotation member such as a sensor, a camera and an antenna to indicate the six directions.

Furthermore, as a device that generates a pseudo gravity free state on the earth, there has been a known two-axis gimbal mechanism that creates a pseudo gravity-free state by constantly changing the gravity direction by rotation around two axes. The six-direction indicator according to the present invention may be used as a pseudo gravity-free state generator in place of the two-axis gimbal mechanism.

Although the present invention has been described and illustrated, it is clearly understood that the same is by way of illustration and example only. The invention is not limited to the above-described embodiments and can be subject to variations and modifications without departing the scope and spirit of the present invention.

What is claimed is:

1. A six-direction indicator provided in an XYZ rectangular coordinate system, comprising:
    an inclined crank mechanism comprising a shaft that extends in an X-axis direction and a rotation member rotatable around an inclined axis inclined with respect to said shaft and coupled to said shaft;
    a driving source that rotates said shaft around the X-axis; and
    a guide member having a zigzag circumferential edge provided around the X-axis of said inclined crank mechanism and bent alternately in a mountain-like shape and a valley-like shape at intervals of 60° around the X-axis,
    said rotation member comprising a guide pin provided around the inclined axis of said rotation member and in contact with said circumferential edge, said guide pin moving around on said circumferential edge by rotation of said shaft and indicating one of positive and negative directions on U, V, and W axes crossing one another at intervals of 60° around the X axis.

2. The six-direction indicator according to claim 1, wherein said guide member comprises a circumferential wall provided around said X-axis, and
    said circumferential edge is an end of said circumferential wall and has a mountain-like portion and a valley-like portion provided alternately at intervals of 60° around the X-axis.

3. The six-direction indicator according to claim 1, wherein said guide member is provided on a side opposite to said driving source with said rotation member therebetween, and
    said six-direction indicator further comprises an elastic member that provides said rotation member with force toward said guide member.

4. The six-direction indicator according to claim 3, further comprising a plurality of said guide pins provided 90° or 180° apart from one another around the inclined axis, wherein said circumferential edge further has a depression in a position where any of said plurality of guide pins is in contact with said circumferential edge when said guide pin indicates any of the U, V, and W axes.

5. The six-direction indicator according to claim 1, wherein said inclined axis is inclined at $\alpha°$ with respect to said shaft, said a ranging from 30° to 40°, and
    said U, V, and W axes cross one another at $\beta°$, said $\beta$ ranging from 80° to 100°.

6. The six-direction indicator according to claim 5, further comprising:
    a rotational angular velocity sensor provided at said rotation member to detect rotational angular velocity components $\omega_U$, $\omega_V$, and $\omega_W$ around the U, V, and W axes;
    a gravitational acceleration sensor provided at said rotation member to detect gravitational acceleration components $g_U$, $g_V$, and $g_W$ in the U, V, and W axis directions;
    a measurer arranged to measure the rotational angular velocity components $\omega_U$, $\omega_V$, and $\omega_W$ detected by said rotational angular velocity sensor and the gravitational acceleration components $g_U$, $g_V$, and $g_W$ detected by said gravitational acceleration sensor when said guide pin moves around on said track by rotation of said rotation shaft and indicates + and − directions on the U, V, and W axes;
    a rotational angular velocity coordinate transformer arranged to coordinate-transform said measured rotational angular velocity components $\omega_U$, $\omega_V$ and $\omega_W$ into rotational angular velocity components $\omega_X$, $\omega_Y$, and $\omega_Z$;
    a gravitational acceleration coordinate transformer arranged to coordinate-transform said measured gravitational acceleration components $g_U$, $g_V$, and $g_W$ into gravitational acceleration components $g_X$, $g_Y$, and $g_Z$; and
    an azimuth angle calculator arranged to calculate an azimuth angle $\psi$ based on the obtained rotational angular velocity components $\omega_X$, $\omega_Y$, and $\omega_Z$ and the obtained gravitational acceleration components $g_X$, $g_Y$, and $g_Z$.

7. The six-direction indicator according to claim 6, wherein said rotational angular velocity coordinate transformer coordinate-transforms said rotational angular velocity components $\omega_U$, $\omega_V$, and $\omega_W$ into said rotational angular velocity components $\omega_X$, $\omega_Y$, and $\omega_Z$ according to the following Expression (1):

$$\begin{bmatrix} \omega_X \\ \omega_Y \\ \omega_Z \end{bmatrix} = \begin{bmatrix} \frac{1}{3\sin\alpha} & \frac{1}{3\sin\alpha} & \frac{1}{3\sin\alpha} \\ -\frac{1}{\sqrt{3}\cos\alpha} & \frac{1}{\sqrt{3}\cos\alpha} & 0 \\ -\frac{1}{3\cos\alpha} & -\frac{1}{3\cos\alpha} & \frac{2}{3\cos\alpha} \end{bmatrix} \begin{bmatrix} \omega_U \\ \omega_V \\ \omega_W \end{bmatrix} \quad (1)$$

said gravitational acceleration coordinate transformer coordinate-transforms said gravitational acceleration components $g_U$, $g_V$, and $g_W$ into said gravitational acceleration components $g_X$, $g_Y$, and $g_Z$ according to the following Expression (2):

$$\begin{bmatrix} g_X \\ g_Y \\ g_Z \end{bmatrix} = \begin{bmatrix} \dfrac{1}{3\sin\alpha} & \dfrac{1}{3\sin\alpha} & \dfrac{1}{3\sin\alpha} \\ -\dfrac{1}{\sqrt{3}\cos\alpha} & \dfrac{1}{\sqrt{3}\cos\alpha} & 0 \\ -\dfrac{1}{3\cos\alpha} & -\dfrac{1}{3\cos\alpha} & \dfrac{2}{3\cos\alpha} \end{bmatrix} \begin{bmatrix} g_U \\ g_V \\ g_W \end{bmatrix} \quad (2)$$

and said azimuth angle calculator calculates an azimuth angle $\psi$ based on said rotational angular velocity components $\omega_X$, $\omega_Y$, and $\omega_Z$ and said gravitational acceleration components $g_X$, $g_Y$, and $g_Z$ according to the following Expression (3):

$$\psi = \tan^{-1}\left( \frac{-\omega_Y \cos\phi + \omega_Z \sin\phi}{\omega_X \cos\theta - \omega_Y \sin\phi \sin\theta + \omega_Z \cos\phi \sin\theta} \right) \quad (3)$$

$$\phi = \tan^{-1}\left( \frac{g_Y}{g_Z} \right)$$

$$\theta = -\sin^{-1}\left( \frac{g_X}{G} \right)$$

$$G = \sqrt{g_X^2 + g_Y^2 + g_Z^2}$$

8. The six-direction indicator according to claim 7, wherein $\alpha$ is 35.26 and $\beta$ is 90.

9. The six-direction indicator according to claim 1, further comprising at least two of said guide pins, said guide pins being provided 180° apart from each other on the same straight line around said inclined axis.

* * * * *